United States Patent [19]

Wiedel

[11] Patent Number: 5,704,283
[45] Date of Patent: Jan. 6, 1998

[54] AUTOMATIC TIE SYSTEM FOR BALER

[75] Inventor: John Wiedel, Chicago, Ill.

[73] Assignee: L & P Property Management Company, Chicago, Ill.

[21] Appl. No.: 547,329

[22] Filed: Oct. 24, 1995

[51] Int. Cl.$^6$ .................................. A01F 15/14; B30B 9/30
[52] U.S. Cl. .................................. 100/3; 100/11; 100/23; 100/31; 206/83.5
[58] Field of Search .................................. 100/3, 11, 17, 100/18, 19 R, 20–23, 31, 33 R; 206/83.5

[56] References Cited

U.S. PATENT DOCUMENTS

| | | | |
|---|---|---|---|
| 275,366 | 4/1883 | Dederick | 206/83.5 |
| 989,260 | 4/1911 | Hinckley | 100/11 |
| 1,180,934 | 4/1916 | Mottier | 100/11 |
| 1,581,794 | 4/1926 | DeHaven, Jr. | 100/31 |
| 1,889,372 | 11/1932 | Nolan | 100/11 |
| 2,173,403 | 9/1939 | Trimble | 100/11 |
| 2,757,599 | 8/1956 | Nolt et al. | 100/11 |
| 2,777,384 | 1/1957 | Nolt et al. | 100/11 |
| 2,792,776 | 5/1957 | Tarbox | 100/23 |
| 2,859,687 | 11/1958 | Hill | 100/23 |
| 2,922,359 | 1/1960 | Brouse et al. | 100/31 |
| 2,982,199 | 5/1961 | Jones | 100/31 |
| 3,918,358 | 11/1975 | Burford | 100/19 R |
| 4,120,238 | 10/1978 | Schäfer et al. | 100/11 |
| 4,155,296 | 5/1979 | Schäfer | 100/3 |
| 4,167,902 | 9/1979 | Bister et al. | 100/3 |
| 4,178,845 | 12/1979 | De Gryse | 100/11 |
| 4,459,904 | 7/1984 | Probst et al. | 100/11 |

FOREIGN PATENT DOCUMENTS

| 152933 | 8/1953 | Australia | 100/23 |
|---|---|---|---|

*Primary Examiner*—Stephen F. Gerrity
*Attorney, Agent, or Firm*—Wood, Herron & Evans LLP

[57] ABSTRACT

An automatic tie system for a baler for tying a bale of compressible material comprises a reciprocating ram for pushing the bale along a path. A continuous strand of baling wire extends generally transverse to the path and engages the bale front end and wraps around the bale as it moves along the path. A reciprocating inserter arm engages the continuous wire strand to form a partial loop at the bale back end having an apex and an upstream wire section and a downstream wire section. A first gripper arm grips the upstream loop section when the loop is cut and moves the upstream loop section generally parallel to an incoming section of wire from a baling wire supply roll to create a supply wire overlap. A second gripper arm grips the downstream loop section and moves it adjacent to the bale and generally parallel to wire from a baling wire supply roll to form a bale wire overlap. A twisting mechanism engages the bale wire overlap and supply wire overlap and twists the overlaps to tie the bale with two in-line twists which have opposite hand twist orientations and lie generally flat against the sides of the bale. Another opposite hand twist reforms the continuous strand of baling wire.

38 Claims, 13 Drawing Sheets

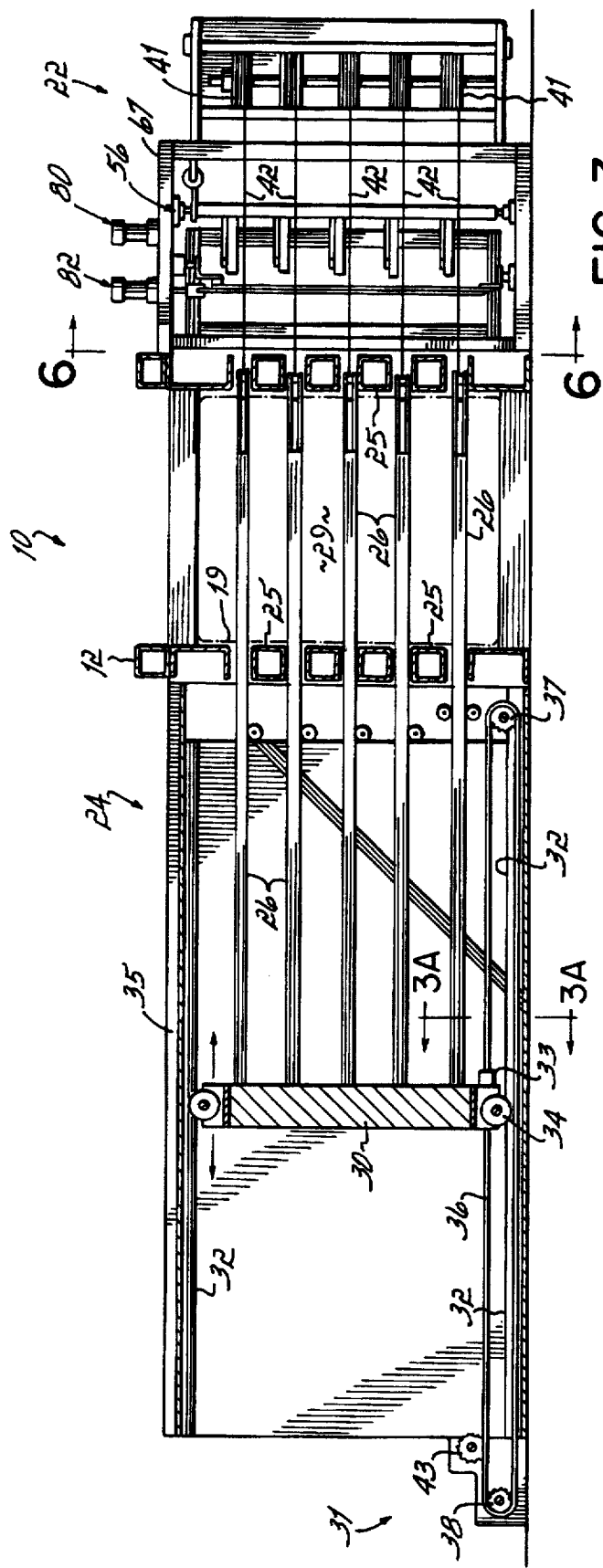
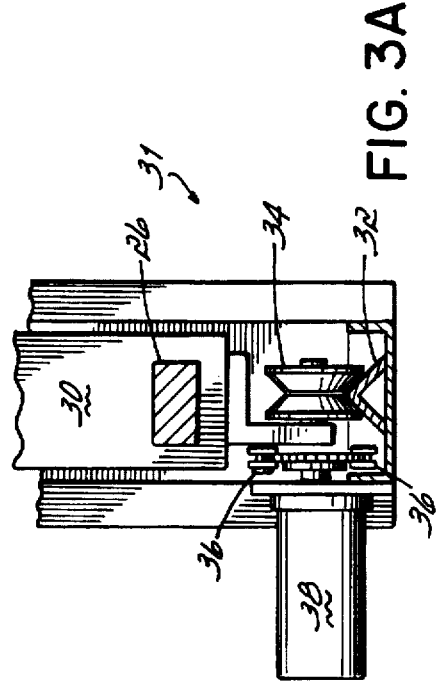
FIG. 3
FIG. 3A

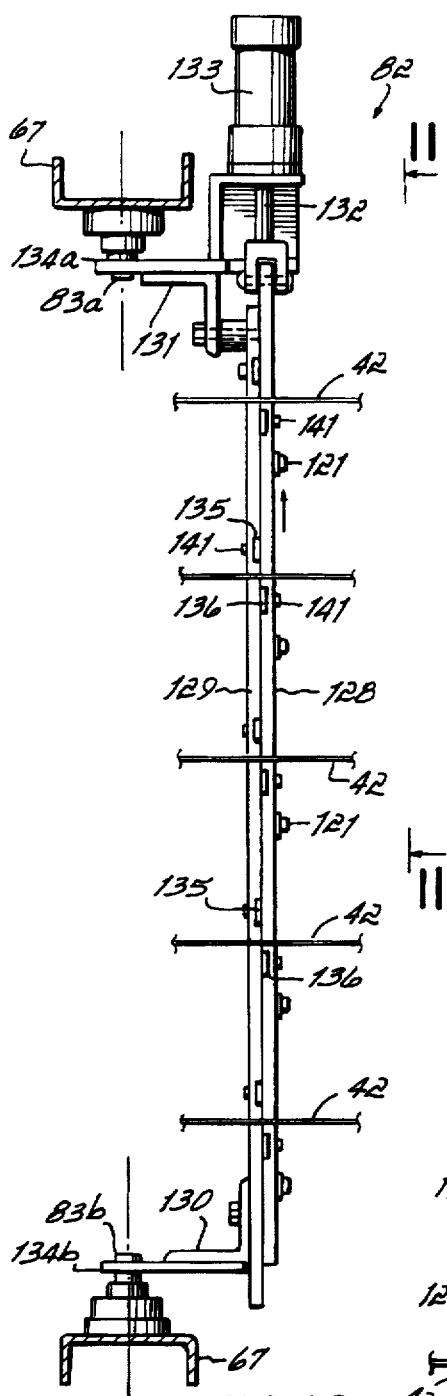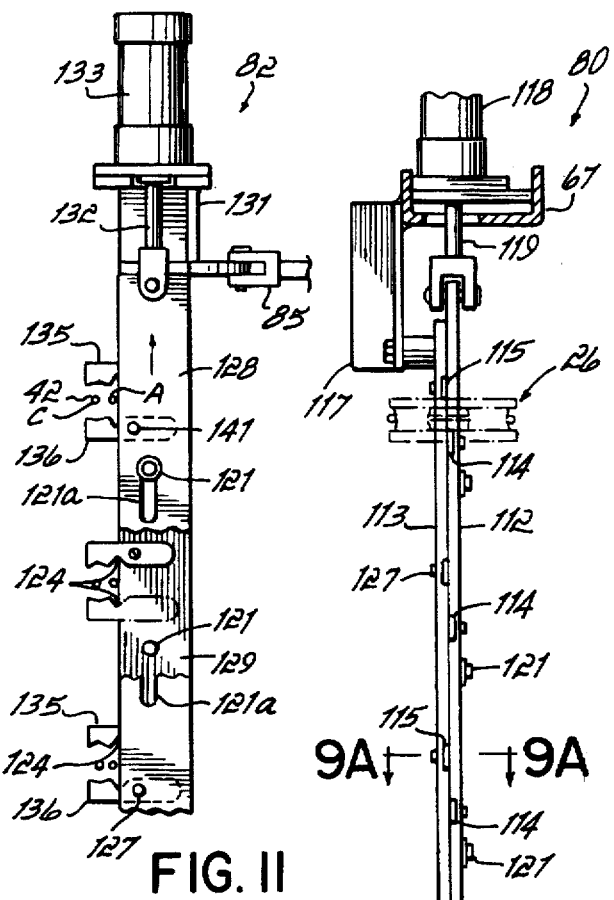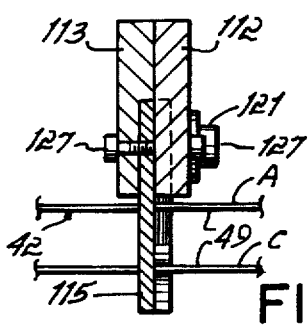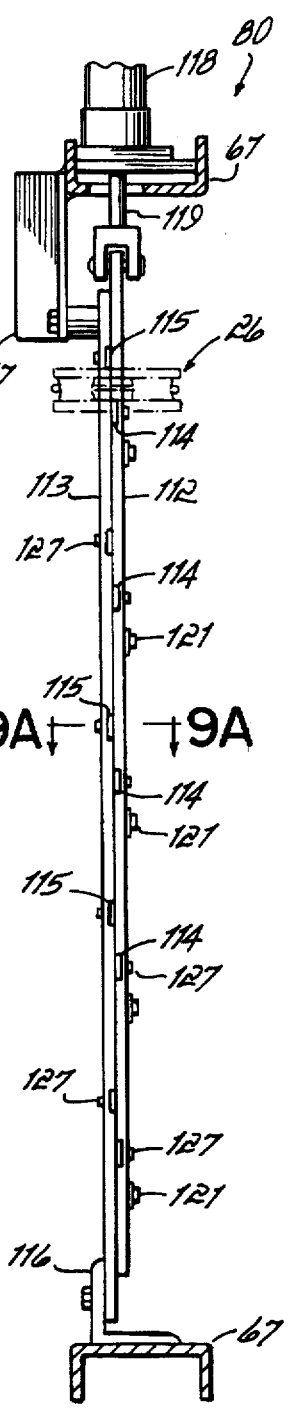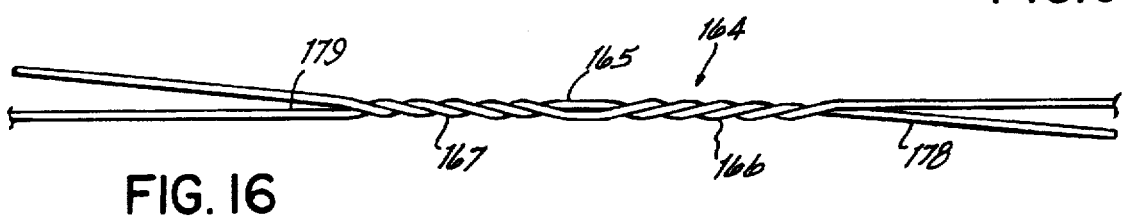

AUTOMATIC TIE SYSTEM FOR BALER

FIELD OF THE INVENTION

The present invention relates generally to tying or binding bales of compressed material within a baler. More specifically, the invention relates to an apparatus and method for automatically tying bales in succession with continuous strands of baling wire supplied from rolls on opposite sides of a bale path.

BACKGROUND OF THE INVENTION

It is generally known to wrap bales of compressible material with wire to keep the bales in a compressed form, such as for shipping and storage. One notable method for tying a bale is referred to as the automatic tie method or auto-tie method in which a bundle of loose, compressible material is pressed into a bale by a ram and moved by the ram through the baler. A plurality of continuous wire strands extend across the bale path at different heights on the bale and are fed by supply rollers positioned on either side of the bale path. As the bale moves through the baler, the wires are wrapped around the front end and sides of the bale, and the wraps extend toward the rear of the bale on both sides of the bale. At a predetermined position along the bale path, reciprocating plungers or needles engage the continuous wire strands and pull or push the strands across the back end of the bale. In doing so, the plungers create loops proximate the back end of the bale. A twisting mechanism then engages sections of wire from the loops and sections of wire from the supply rolls and twists the respective sections together. One side of the twist forms a completed tie or wrap around the bale, while the other side of the twist again reforms a continuous strand of baling wire between the supply rolls. The twist is then cut proximate its center such that the tied bale continues through the baler and the continuous strands engage the next successive bale for further wrapping or tying. Examples of various auto-tie methods are illustrated in U.S. Pat. Nos. 4,120,238; 4,155,296; 4,167,902 and 4,459,904.

While such methods have proven somewhat suitable for baling and tying compressed bales, currently available methods have several drawbacks which reduce the efficiency of the baling process and further reduce the strength of the wire ties or wraps. Furthermore, the location of the wire twist structures on the bale and their shape and formation present difficulties both during tying and after the bales have been tied.

For example, existing methods and apparatuses create twists which are cut in the middle wherein one side of each twist stays attached with the bale, while the other side of each twist connects the wires from the supply rolls together to form a continuous wire strand. The cuts yield two pigtail structures for each tying wire, one on the bale and one on the continuous strand. The pigtails on the continuous wire strands are then located on the next successive bale that is wrapped and tied. Therefore, each bale has generally two pigtails per wrap. Each pigtail structure is twisted with either a right-hand or left-hand twist and extends generally transverse to the wire strands. The pigtail twists stick out from the bale such that they may be caught in the tying mechanism as the bale progresses therethrough, particularly if the bale is a short bale. The pigtails also have a tendency to catch on other structures, such as other bales, when the bales are stacked on top of each other, and thereby provide resistance to separation when the bales are to be used. Still further, the twists are made when the bale is tightly wrapped causing an unequal twisting tension wherein the pigtails on the bale are weakened, making them subject to breakage when the bale is handled. Furthermore, since the twists have a single twist orientation (i.e., left hand or right hand), they are subject to unravelling. Bending the pigtails downwardly parallel with the baling wire to prevent some of the above-discussed drawbacks also weakens the pigtail and the wire wrap and promotes unravelling.

Therefore, it is an objective of the present invention to bind and tie a bale of compressible material quickly and efficiently with continuous strands of baling wire positioned for automatically wrapping and tying successive bales.

It is a further objective of the present invention to wrap and tie bales with a strong durable twist which has sufficient strength to hold the bales together even during handling.

It is another objective of the present invention to eliminate pigtail twists and the drawbacks associated with such pigtail twists during the wrapping and tying of a bale.

Still further, it is an objective of the invention to produce a bale which may be handled and stacked without breaking the wire ties or jeopardizing the integrity of the wire ties.

It is a further objective to tie a bale with twists that are not subject to being easily unravelled when the bale is handled.

SUMMARY OF THE INVENTION

The above-discussed objectives and other objectives are addressed by the automatic baler tie system of the present invention which is utilized with a baler having a reciprocating ram which pushes a bale along a path through the baler. The baler tie system comprises supply rolls of baling wire positioned on opposite sides of the bale path and coupled together to form continuous strands of baling wire which extend generally transverse to the bale path on the sides of the bale to engage a front end of the bale and wrap around the front end and sides of the bale as it is pushed along the path. Preferably, a plurality of strands extend across the path at different heights for wrapping and tying the bale in a plurality of spaced vertical planes along the height of the bale. The bale is engaged by a wire inserter assembly and a tying assembly of the system for wrapping and tying the bale.

When the ram reaches a predetermined position along the path, the inserter assembly is actuated and a plurality of parallel, reciprocating inserter arms of an inserter mechanism move through grooves in the ram in a direction generally transverse to the bale path. The inserter arms have forked ends which engage the continuous baling wire strands and move the strands across the back end of the bale to form partial wire loops. Each wire loop has an apex across the forked arm end with an upstream wire portion and a downstream wire portion. The loops are then engaged by the tying assembly having a gripper mechanism, cutting mechanism and a twisting mechanism.

When the inserter arms have formed the various loops, the gripper mechanism engages the loops and includes first gripper arms pivotally mounted to swing into engagement with the upstream wire portion of the loops. The first gripper arms each include a hook portion and spring-loaded gripping device which cams against a surface of the inserter arm at one side of the arm to engage the respective upstream loop portion and grip the upstream loop portion when the gripper arm is moved away from the inserter. A plurality of pivotally-mounted second gripper arms swing into engagement with the downstream loop portions and each includes a similar hook portion and gripping device which engages and grips the downstream loop portion. The gripper arms then swing away from the inserter arms to pull the upstream and downstream loop portions away from the arms.

When the downstream and upstream loop portions are gripped, a cutting mechanism is activated which has a blade configured to fit within the forked ends of the gripper arm proximate the loop apex. The cutting mechanism is activated and the loops are cut at the apex to divide the loop and create a loop downstream portion having a free end and an upstream portion having a free end. The inserter arms then withdraw to await the next bale.

After each loop has been cut, the second gripper arms pivot to move the gripped downstream loop portions to a position adjacent to the side of the bale and proximate respective sections of wire from the baling wire supply rolls which are wrapped around the bales. The downstream loop portions and the sections of wire are generally parallel to each other, and thus create bale wire overlaps at a side of the bale. The first gripper arms pivot and move the upstream loop portions into a position proximate other sections of wire from the baling wire supply rolls. The upstream loop portions and incoming wire sections are generally parallel to each other, and supply wire overlaps are created.

A twisting mechanism including twister heads then engages both sets of wire overlaps to create the twists. Specifically, each twister head includes a rotating twister assembly having a slot formed therein which receives the adjacent free wire sections of a wire overlap. The twisting mechanism is movable such that the twister heads and rollers engage the bale wire overlaps first, and the rollers rotate to create wire twists. The twister assemblies are configured to hold the generally parallel wires in the center sections of the overlaps adjacent to one another such that a twist is formed having a center portion and opposite end portions which have opposite twist directions relative one another. Therefore, each twist has a right-hand twist portion and an adjacent left-hand twist portion.

Preferably, the twister assemblies include a shaped slot, and a sloped surface is formed proximate an end of the slot to direct the overlapped wires inwardly to the center section of the twister assembly for a proper twist. In that way, the bale is tied tightly with a twisted wire tie. The twist of each wire tie is formed generally parallel to a side of the bale, and since each twist includes at least one free wire end which is free to slide in the twist, the twists have generally equal twisting tensions throughout their lengths such that there are effectively no weakened areas on the tie or twist. The parallel twists are not pigtail twists and thus do not extend away from the bale. Furthermore, the opposite hand twist portions of each twist cooperate to make a strong twist that is resistant to unravelling. The bale wire overlap includes a section of wire still connected to a supply roll of wire.

After the bale wire overlaps and twists are created, the twisting mechanism subsequently moves into position adjacent the supply wire overlaps such that the supply wire overlaps are received by the twister assemblies of the twister heads to form second twists. The second twists of the supply wire overlaps couple the free incoming wire ends of one set of supply rolls with sections of wire from an opposite set of supply rolls to reform the continuous wire strands for engaging the front end of the next successive bale.

Before the second twists are formed, a rotating cutting mechanism swings into position to cut the continuous section of baling wire between the first twists and a first set of supply rolls such that the twists are separated when the twisting mechanism twists the second twists. That is, the cut from the rotating cutting mechanism and subsequent twists creates a set of first twists wrapped around the bale which tie the bale and a second set of twists which reform the continuous wire strands between the sets of supply rolls to engage and tie the next successive bale. When the twists are formed, the respective gripper arms pivot further to engage cam surfaces which act upon the grip devices of the gripper arms to disengage the gripping action so that the respective loop portions of the twists are ungripped although still held by the arm. Therefore, the bale moves along and the twists are released from the gripper arms.

Thereby, a bale of compressible material may be tied and moved on for further processing and the baler tie system of the invention is ready for the next bale. Furthermore, each bale will be tied with two twists, one formed when the previous bale was tied and one formed to actually bind and tie the present bale. Like the first twist used to tie the bale, the second twist at the supply wire overlap is formed parallel to the wires and to the bale side with no pigtail, and since free wire ends are used to form the twists, unlike the prior art methods, bound or weakened areas of the twists are reduced. Therefore, the bale tie utilizing the present invention includes a plurality of wraps each having two strong opposite hand twists to hold the wraps or ties around the bale.

Preferably, a plurality of wire ties are wrapped around the bale and accordingly, the tying assembly includes a plurality of pairs of first and second gripper arms in addition to a plurality of rollers within the twister heads and a plurality of respective cutting mechanisms and a plurality of camming surfaces associated with each gripper arm pair.

The automatic baler tie system of the present invention creates wire twists which extend generally parallel to a side surface of the bale and lie generally flat against the bale side surface. Therefore, there are no twisted pigtails created and no twists protruding from the bale to catch on objects or to be caught in the baler. Furthermore, the absence of pigtails prevents any twists from one bale catching on another bale thereby allowing for easy separation when the bales are moved or stored. The supply wire overlap also does not have a twisted pigtail which further prevents damage to the tying mechanism when the next successive bale is tied. Each tied bale will include second twists formed when the previous bale was tied, i.e., the supply wire overlap twists, and first twists formed when the present bale is tied, i.e., the bale wire overlap twists.

Still further, the twisted overlaps of the invention have opposite hand twists and are generally twice as strong as pigtail twists, thus providing a greater tying or binding tension on the bale. Additionally, the twists are durable and not as subject to breakage as pigtail twists because the overlaps are formed by twisting with at least one free wire end and therefor the wire end is free to move as the twist is made in order to compensate for any unequal tension formed in the twist. Thus, weak or bound points of the twists are reduced or eliminated.

The above and other advantages of the present invention shall be made apparent from the accompanying drawings and the description thereof and a detailed description of the invention.

BRIEF OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 3 is a cross-sectional view along lines 3—3 of the baler of FIG. 1 illustrating the wire inserter assembly;

FIG. 3A is a cross-sectional view along lines 3A—3A of FIG. 3 illustrating the translating mechanism of the inserter assembly;

FIG. 7A is a top view, partially cut away, of an inserter arm and gripper arms of the invention shown engaging a wire loop, while

FIG. 9 is a front view of a stationary cutting mechanism in the tying assembly of the invention;

FIG. 9A is a cross-sectional view along lines 9A—9A of FIG. 9;

FIG. 10 is a side view of a rotatable cutting mechanism in the tying assembly of the invention;

FIG. 11 is a side view, taken on view lines 11—11 of the rotating cutting mechanism of FIG. 10;

FIG. 15A is a cross-sectional view along lines 15A—15A of FIG. 13 showing a twister assembly engaging overlapped wires to form a twist in accordance with the principles of the present invention, while

FIG. 16 is a view of a twist for tying a bale created by the present invention;

DETAILED DESCRIPTION OF THE INVENTION

Figure 1:
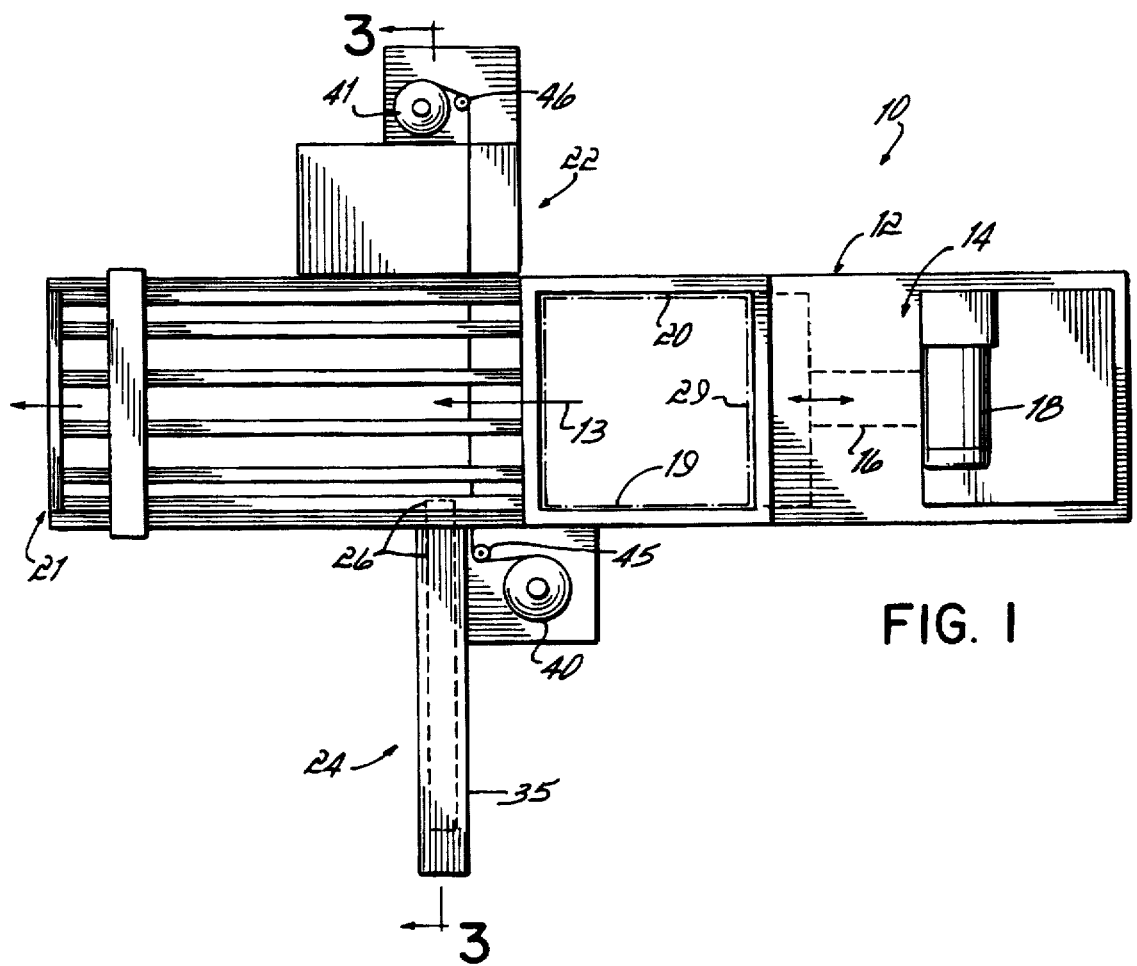
FIG. 1 is a top schematic view of a baler, incorporating the automatic baler tie system of the invention.

FIG. 1 schematically illustrates a baler 10 utilizing the automatic baler tie system of the present invention and includes a frame 12 defining a baling path 13 therethrough. A ram mechanism 14, including a reciprocating ram 16 and drive motor 18, are positioned in one end of frame 12. The reciprocating ram 16 moves back and forth and acts upon a bale 19 of compressible material which is placed in a hopper 20 of the baler 10 and pushes the bale along the baling path 13, whereupon the bale is tied and exits an outlet end 21 of the baler 10. As the bale 19 is moved along the baling path 13, a tying assembly 22, cooperates with a wire inserter assembly 24 in accordance with the principles of the present invention to tie bale 19 as it progresses through baler 10. As discussed further hereinbelow, the bale is tied around its sides at several vertically-spaced planes. A section of frame 12 proximate the tying assembly 22 is preferably formed at its side with parallel slats 25, which allow a plurality of reciprocating inserter arms 26 to extend across a back end of bale 19 (See FIG. 2) and, as discussed below, allow twister heads (FIG. 12) to engage baling wire and tie bale 19.

WIRE INSERTER ASSEMBLY

Figure 2:
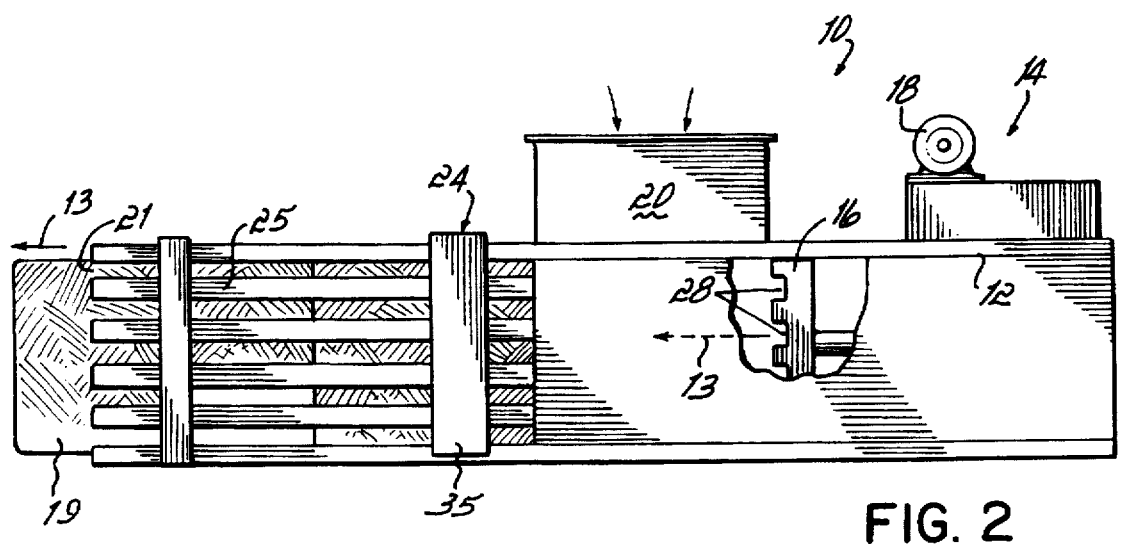
FIG. 2 is a side view of the baler of FIG. 1.
Figure 4A:
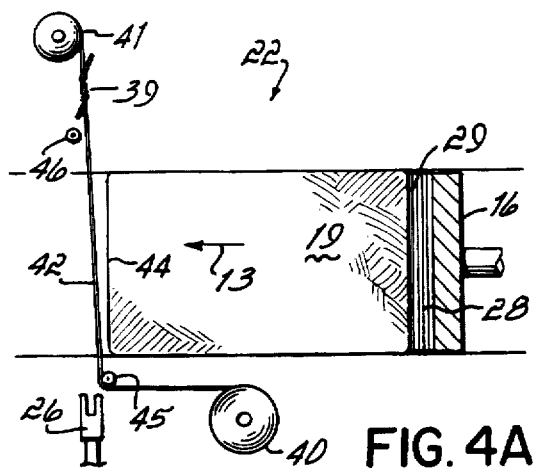
FIGS. 4A–4G are top schematic views of a bale being tied by the automatic baler tie system of the invention, schematically illustrating operative components of the tie system.
Figure 4B:
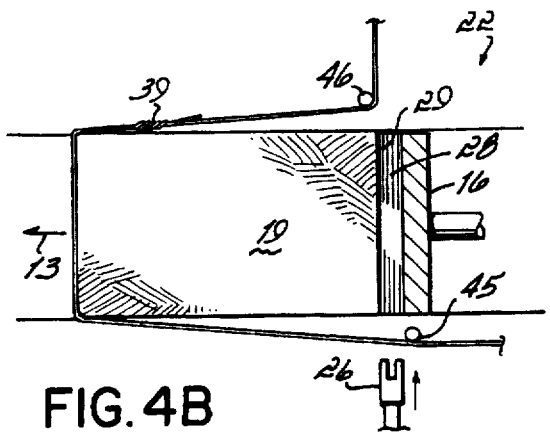
Figure 4C:
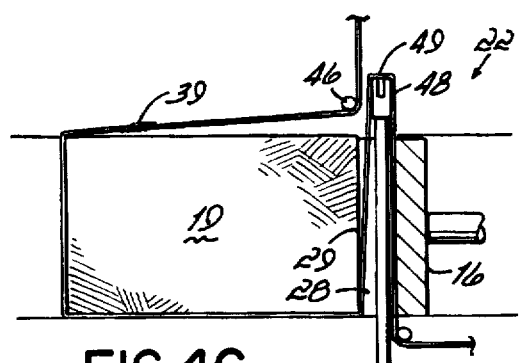

As illustrated in FIG. 2, the front pushing surface of 5 ram 16 has a plurality of elongated parallel channels 28 formed therein which extend from side-to-side on ram 16 generally transverse path 13. The wire inserter assembly 24 of the invention, including an inserter mechanism 31, is activated to engage the bale 19. Inserter mechanism 31 includes a plurality of inserter arms 26. The channels 28 receive the reciprocating inserter arms 26, which extend across the back end 29 of bale 19 (See FIGS. 3 and 4A–C). The inserter arms 26 operate as part of wire inserter mechanism 31 and engage continuous strands of baling wires 42 (See FIGS. 4A–4D). The wire strands 42 are supplied across path 13 by two sets of supply rolls 40, 41 which are positioned on opposite sides of baler 10 and path 13. As the bale 19 moves along path 13 it engages the wire strands 42 which wrap around the front end 44 and sides of bale 19 (FIGS. 4A–4B). The arms 26, when extended, form wire loops proximate the bale back end 29 for tying bale 19 (FIG. 4C).

As illustrated in FIG. 3, the plurality of parallel inserter arms 26 are secured at one end to a mount 30 of inserter mechanism 31. Mount 30 is coupled to upper and lower triangular guide tracks 32 by appropriately shaped guide wheels 34 and the inserter mechanism is preferably enclosed within a frame 35 (See FIG. 3A). The mount 30 and inserter arms 26 are translated in a direction generally transverse to the path 13 of the bale 19 (See FIG. 1). The inserter mechanism 31 includes an endless chain 36 which is coupled at 33 to a bottom end of mount 30 proximate the bottom guide wheel 34. The endless chain 36 is moved around a sprocket 37 by a motorized sprocket 38 to reciprocate the inserter arms 26 across the bale path 13. A guide sprocket 43 provides tension on chain 36. As illustrated in FIG. 3, the inserter arms 26 are preferably dimensioned in length such that they extend entirely across the baler path 13 in their full range of motion to engage tying assembly 22, which is positioned on the opposite side of the baler 10. At the tying assembly 22, the wire loops formed by the inserter arms 26 are gripped, cut and tied to bind bale 19. The loose wire ends from the rolls 40, 41 are then twisted together to reform the continuous wire strands 42 to tie the next bale. As mentioned, the inserter arms are dimensioned to extend between the parallel slats 25 of frame 12 to engage the tying assembly 22. Before describing the various other components, description of the operation of the baler tie system is helpful in understanding the overall invention.

OPERATION OF BALER TIE SYSTEM

Figure 4D:
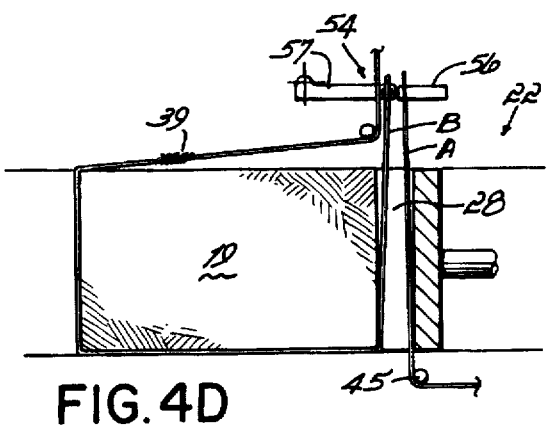

FIG. 4A is a schematic top view of a bale 19 progressing through the baler tie system of the present invention. Specifically, bale 19 is pushed by ram 16 along the bale path as indicated by arrow 13. Tying assembly 22 includes the wire supply rolls 40, 41 of baling wire positioned on either side of the bale path 13. The wire end sections of opposing supply rolls are twisted together at a twist 39 to form continuous strands of bale wire 42 which extend generally transverse to bale path 13 and the movement of bale 19. The bale front end 44 engages strand 42 as the bale is moved. As seen in FIG. 4B, guide rollers 45, 46 are positioned proximate each supply roll 40, 41 to engage the strands 42 such that as the bale moves, the strands 42 are stretched across front end 44 and are wrapped around the sides of bale 19 (See FIG. 3). When a back end 29 of the bale 19 passes guide roller 45, the inserter mechanism 31 is activated and the inserter arms 26 engage the bale wire strands 42 proximate the supply rolls 40. The arms 26 extend transverse to path 13 through ram channels 28 to form wire loops 48 across the bale back end 29 (See FIG. 4C). The inserter arms 26 are dimensioned such that the apex 49 of loop 48 is positioned proximate a section of bale wire coming from the supply roll 41 (See FIGS. 4C and 4D). A cutting mechanism (FIGS. 9, 9A) engages the loop apex 49 and cuts the loop 48 thereat to create an upstream loop portion A and a downstream loop portion B as illustrated in FIG. 4D. Prior to the cut at apex 49 a gripper mechanism 54 engages the upstream and downstream portions of wire loop 48. As illustrated in FIG. 4D, the gripper mechanism 54 includes a first gripper arm 56, which grips upstream wire portion A and a second gripper arm 57, which grips downstream portion B. The gripper arms 56, 57 are pivotally mounted to swing into position to grip the portions of loop 48. When the portions of loop 48 are gripped, they are swung slightly apart by arms 56, 57 and then the cut is made as the inserter arm 26 is withdrawn. The gripper arms 56, 57 maintain the loop portions A, B generally parallel to each other.

Figure 4E:
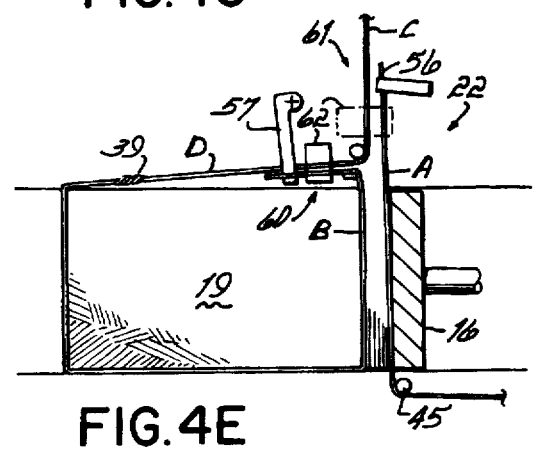

Referring now to FIG. 4E, gripper arm 57 is activated to swing or rotate downwardly to bring the downstream loop portion B adjacent a side of bale 19. Downstream portion B is placed proximate a portion of wire D which is attached to the supply roll 41 over guide roller 46. The downstream loop portions B and wire portion D form bale wire overlaps 60 at a side of the bale. The upstream loop portions A held by the gripper arms 56 remain proximate another wire portion C connecting wire portion D to the supply roll 41. Since the upstream portions A are connected to supply rolls 40, the upstream portions A and wire portions C form supply wire overlaps 61.

Figure 4F:
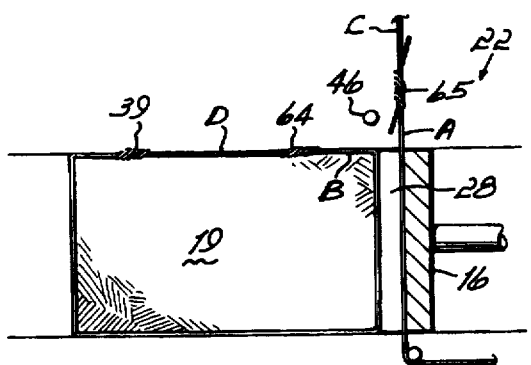
Figure 4G:
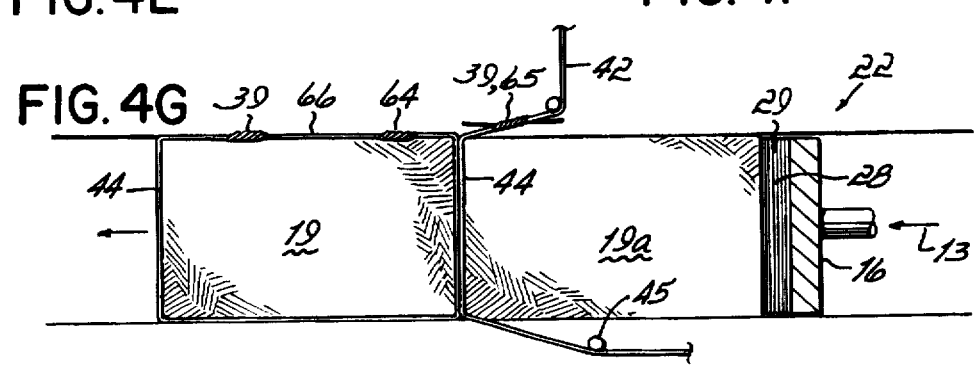

Movable twister heads 62 engage bale wire overlaps 60 and form first twists to tie the bale wires around the bale (see FIG. 4E). The twister heads 62 then subsequently move to engage the supply wire overlaps 61 and thereby form second twists to reform continuous strands 42 of baling wire for the next successive bale 19 as seen in FIG. 4F. Before the second twists are formed at the supply wire overlaps 61, another cut is made between the wire portions C and D to separate the the wires and thus separate twists. Accordingly, the ties or bands 66 of each bale 19 has two successive twists 39, 64 formed on a side thereof (see FIG. 4F). Twist 65 reunites the wire portions A, C from the supply rolls 40 and 41 similar to the twists 39 shown in FIG. 4A. Therefore, bale 19 is completely tied with bands 66 and continuous strands of wire 42 are again ready to engage another bale 19a as shown in FIG. 4G. FIGS. 4A–4G only illustrate a single wire strand 42 being wrapped around bale 19. However, in accordance with the principles of the present invention, one or more strands, and preferably five strands, are wrapped around bale 19 when it is tied.

TYING ASSEMBLY

Figure 5A:
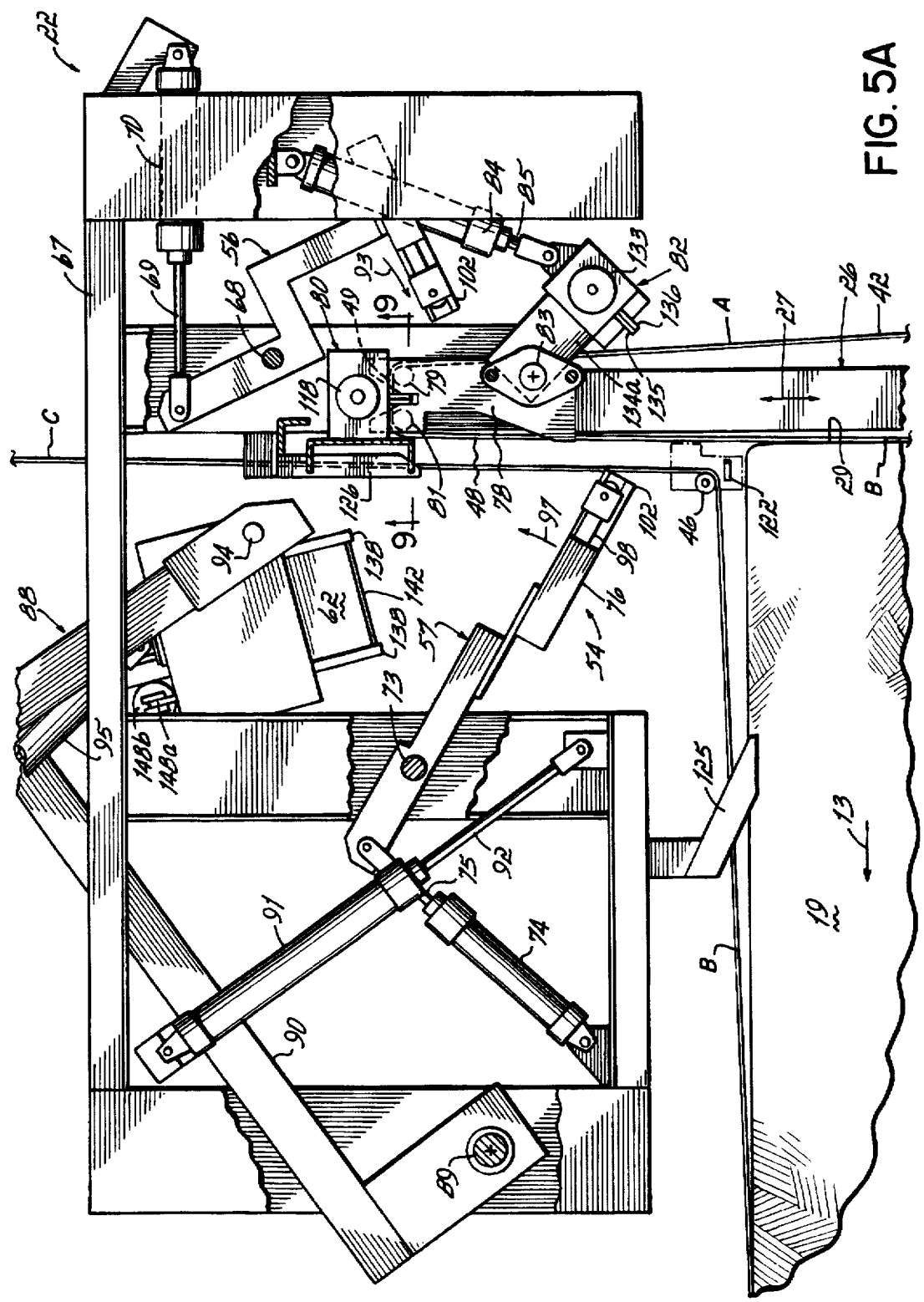
FIG. 5A is a top view, partially cut away, of the tying assembly of the invention showing various components in operation when inserter arms of the wire inserter assembly are activated.
Figure 5B:
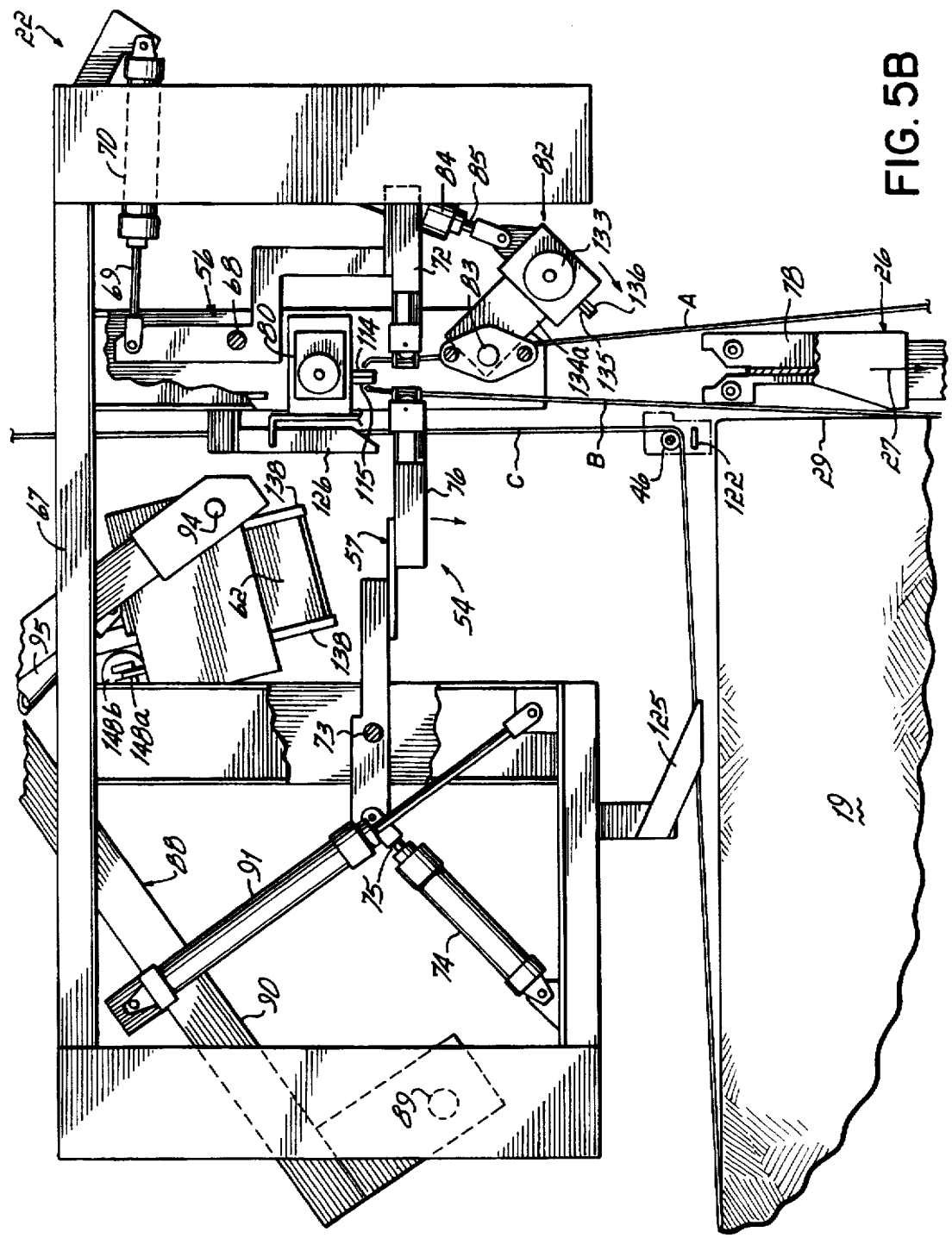
FIG. 5B is a top view, partially cut away, of the tying assembly of FIG. 5A illustrating the creation of wire loop portions.
Figure 5C:
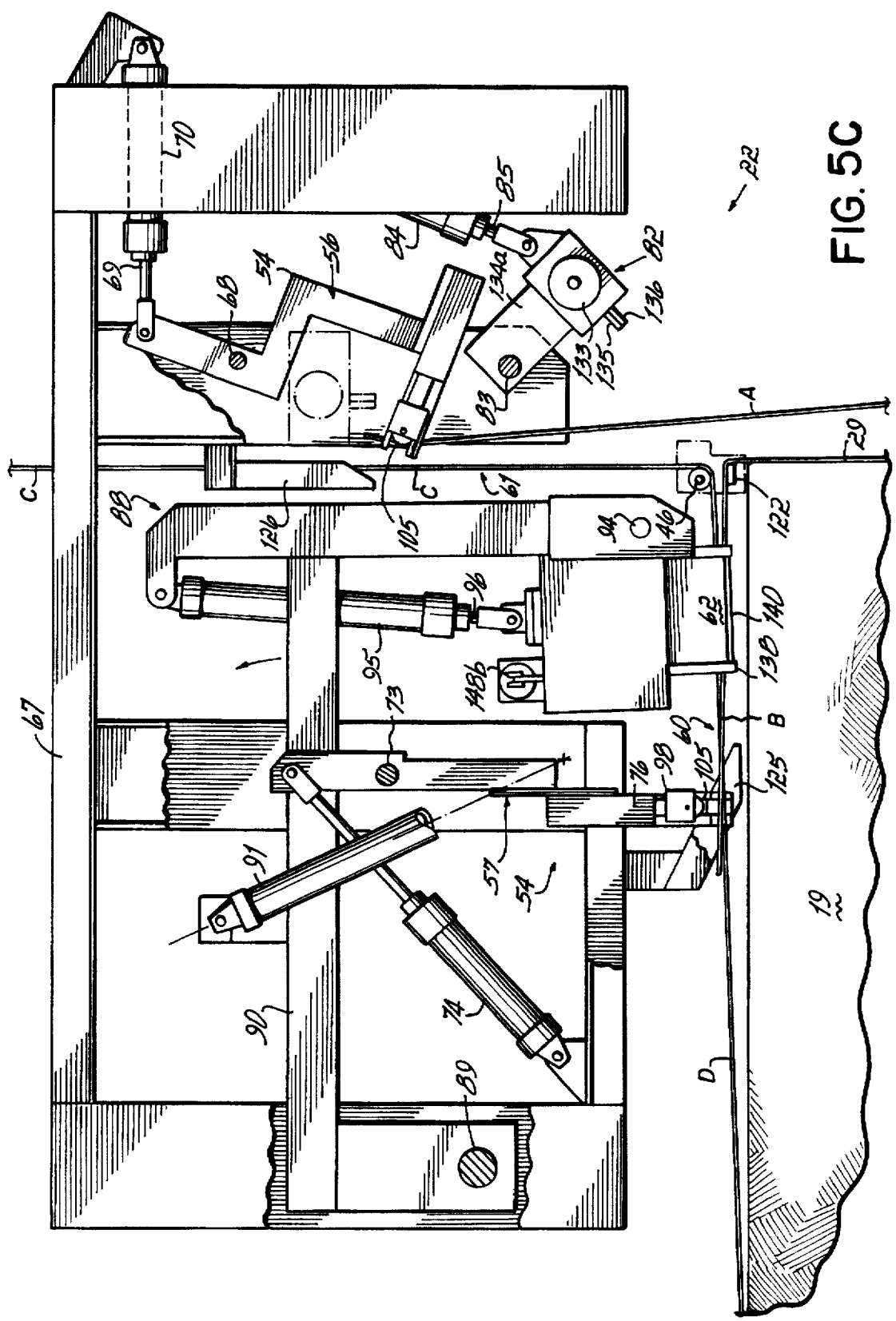
FIG. 5C is a top view, partially cut away, of the tying assembly of FIG. 5A illustrating formation of a bale twist to tie a bale.
Figure 5D:
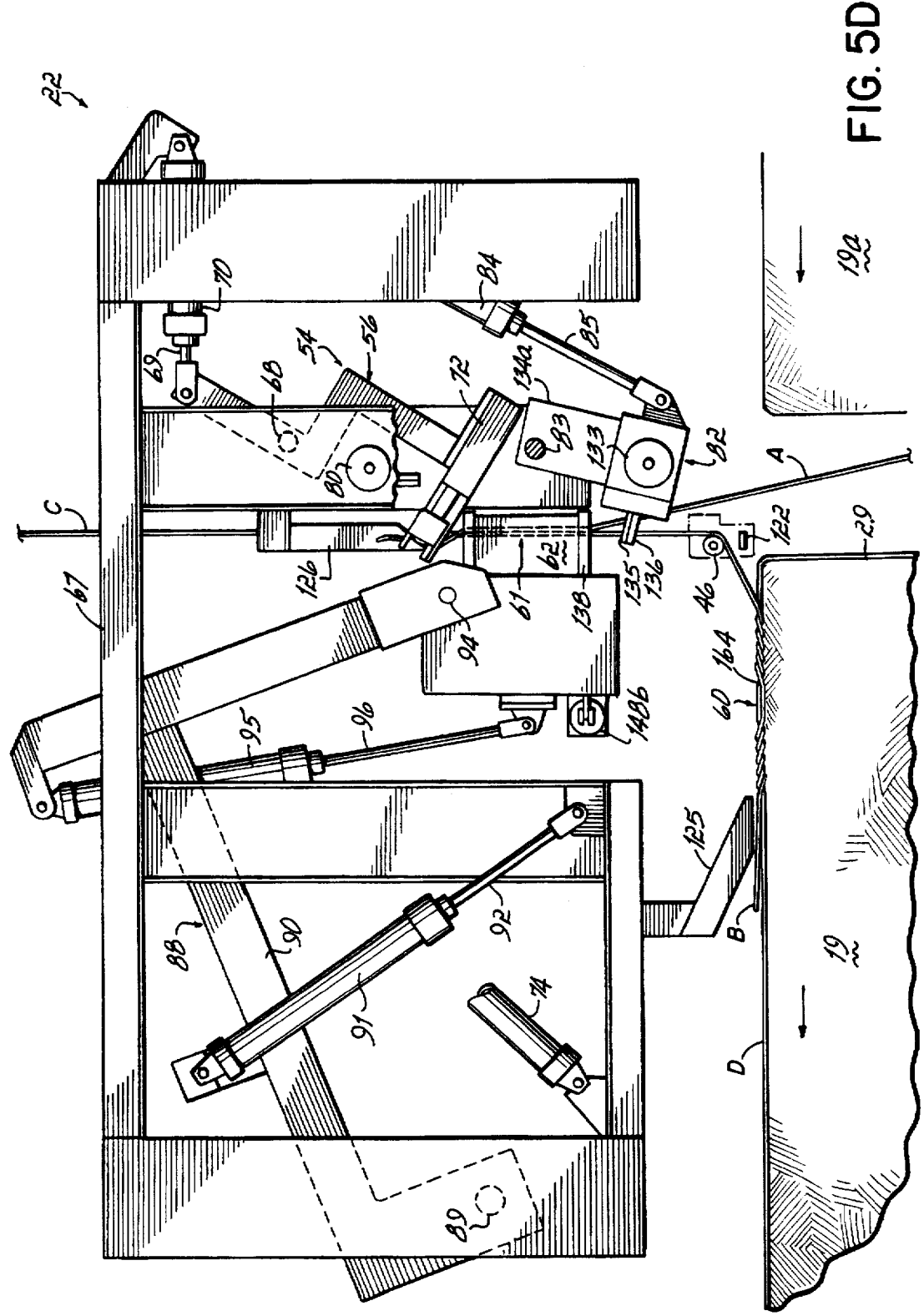
FIG. 5D is a top view, partially cut away, of the tying assembly of FIG. 5A illustrating formation of a supply wire twist to connect opposite rolls of wire together as a continuous strand.
Figure 6:
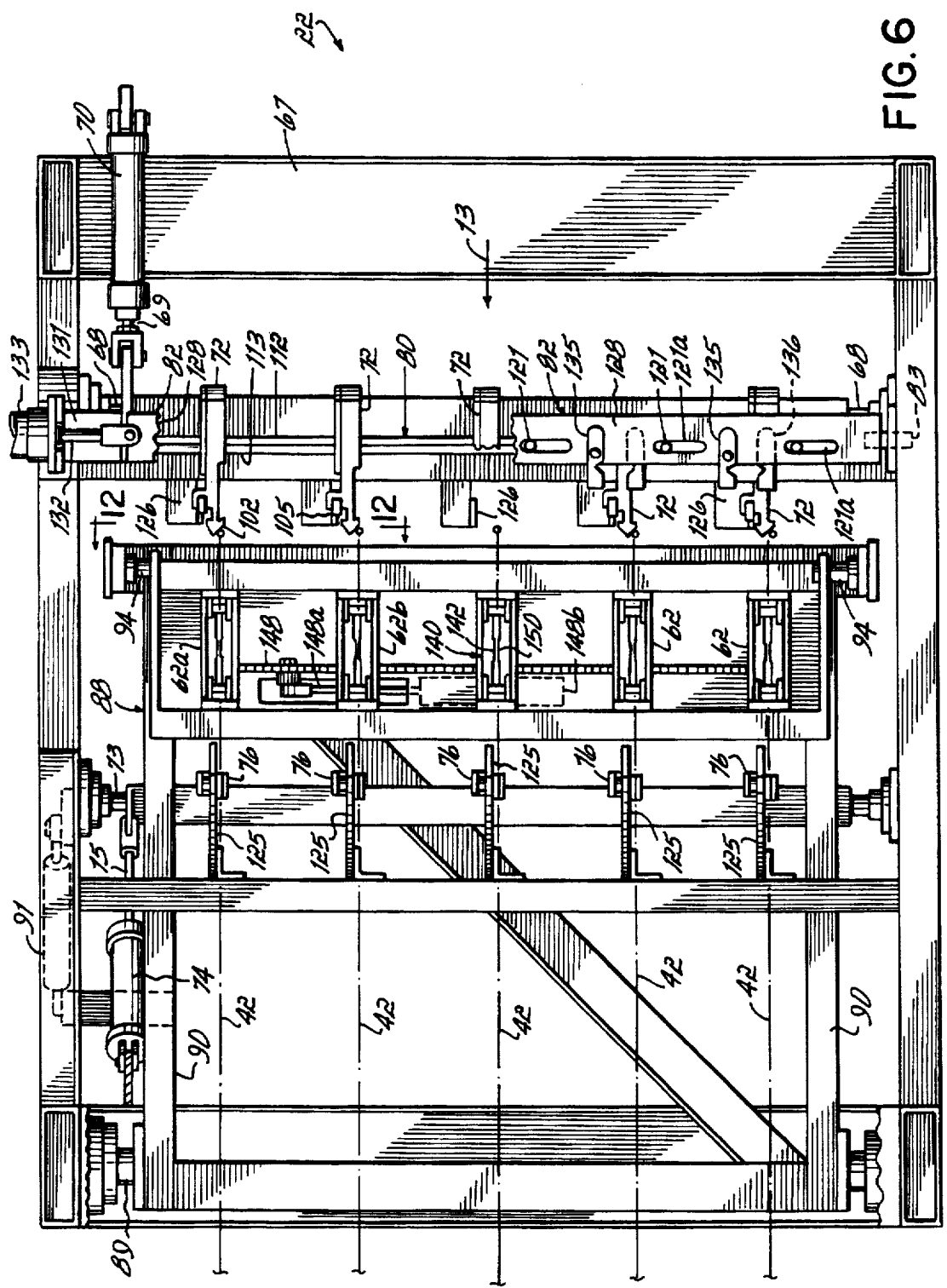
FIG. 6 is a cross-sectional view along lines 6—6 of FIG. 3 illustrating the front of the tying assembly of the invention.

FIGS. 5A–5D illustrate a detailed top view of the tying assembly 22 of the invention. Tying assembly 22 includes a frame 67 by which various of the individual mechanisms and components of the tying assembly are supported. FIG. 5A illustrates a single level of the tying assembly, whereas a preferred embodiment of the present invention utilizes five levels of mechanisms and devices for gripping and twisting the baling wire around bale 19, as illustrated in FIG. 6. The tying assembly 22 includes a gripper mechanism with pairs of first and second gripper arms 56, 57 which grip the upstream and downstream loop portions A, B, respectively, when the tying assembly 22 is activated. A stationary cutting mechanism 80 cuts the loops 48 to form portions A, B. A twisting mechanism 88 with twisters heads 62 engages the wire overlaps 60, 61 to form the twists to tie bale 19 and reform wire strands 42. Then, a rotating cutting mechanism 82 cuts the wire strands 42 to form wire portions C, D and to separate the first and second twists.

Each mechanism of the tying assembly 22 will be described hereinbelow as having individual components where appropriate, with the understanding that various of the components are duplicated in the mechanism to form a plurality of ties (preferably five (5)) around a bale 19. For example, individual gripper arms 56, 57 will be discussed with the understanding that there are preferably five pairs of gripper arms 56, 57 in tying assembly 22. The various components of the inserter assembly and tying assembly are preferably formed of steel unless otherwise stated.

Gripper Mechanism

The first gripper arm 56 of the gripper mechanism 54 is rotatably attached to a suitable portion of frame 67 at pivot 68. One end of the first gripper arm 56 is coupled to a reciprocating shaft 69 of an actuating cylinder 70. The actuating cylinder may be any suitable pneumatic or hydraulic cylinder, as are well known in the art, which is coupled to a control system (not shown) for rotating and actuating the first gripper arm 56. Attached at the end of gripper arm 56, opposite shaft 69, is a gripping device 72 shown in greater detail in FIGS. 7A, 7B, and 8 and described further hereinbelow. A second gripper arm 57 rotatably attached to frame 67 at pivot 73 is somewhat similar to gripper arm 56. An actuating cylinder 74 and shaft 75 rotate gripper arm 57 in its operable range of motion. The second gripper arm 57 also includes a gripping device 76 similar to gripping device 72.

As shown in FIG. 5A, when the inserter arm 26 forms wire loop 48, the first gripper arm 56 is located proximate the upstream side of loop 48 while the second gripper arm 57 is proximate the downstream side of loop 48. At this stage in the process, the arms 56, 57 rest out away from loop 48. The inserter arm 26 moves reciprocally with respect to the tying assembly 22, as illustrated by arrow 27. Inserter arm 26 includes a forked end 78 and rollers 79, 81 over which the wire loop 48 is stretched prior to being cut by cutting mechanism 80, which is also coupled to frame 67.

A more detailed view of stationary cutting mechanism 80 is shown in FIGS. 9, 9A. A second rotating cutting mechanism 82 is pivotally mounted to frame 67 at pivot 83. A more detailed view of the rotating cutting mechanism 82 is illustrated in FIGS. 10 and 11 discussed hereinbelow. Rotating cutting mechanism 82 is actuated by a cylinder 84, which is pivotally connected to the cutting mechanism 82 by shaft 85. Cylinder 84 is preferably pivotally mounted to frame 67. To twist the wire ends at the bale wire overlap 60 and supply wire overlap 61 (FIG. 4E), twisting mechanism 88 is pivotally connected to frame 67 at pivot 89. Twisting mechanism 88 includes a L-shaped support arm 90, which is moved by cylinder 91 and shaft 92, which is coupled to frame 67. Twister head 62 is pivotally connected to arm 90 at pivot 94 and is actuated by a cylinder 95 and shaft 96, which are also coupled to arm 90. As is illustrated in FIGS. 5C and 5D, the twister mechanism 88 moves such that twister head 62 twists the bale wire overlap 60 and then the supply wire overlap 61.

Figure 7A:
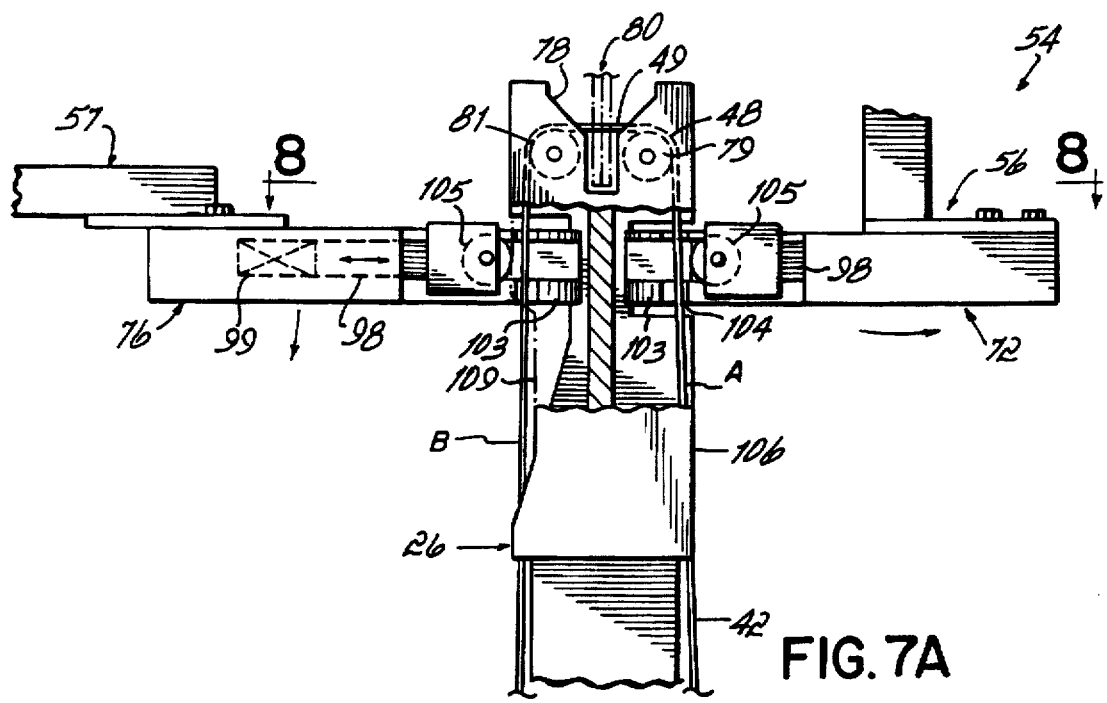

FIG. 5A illustrates the relative locations of the various components of tying assembly 22 when the inserter arm 26 is moved across the bale back end 29. Inserter arm 26 forms wire loop 48, and the apex 49 of the wire loop is stretched across the forked end 78 of inserter arm 26 (FIG. 7A). At its most extended position, as shown in FIG. 5A, the inserter arm 26 is positioned to be engaged by cutting mechanism 80. At this stage in the tying process, the first and second gripper arms, 56, 57, the rotating cutting mechanism 82 and the twisting mechanism 88 are located in their rest positions away from wire loop 48.

When inserter arm 26 is fully extended, the first and second gripper arms 56, 57 are actuated by cylinders 70, 74, respectively, to swing into position and grip the upstream and downstream portions A, B of loop 48. In FIG. 5A, arrow 93 illustrates movement of the first gripper arm 56 while arrow 97 illustrates the movement of the second gripper arm 57. Turning now to FIG. 5B, the gripping devices 72 and 76 are shown engaging the upstream loop portion A and downstream loop portion B, respectively. Shaft 69 of cylinder 70 is retracted to move gripping device 72 into position, and shaft 75 of cylinder 74 is similarly retracted to move gripping device 76 into position.

Figure 7B:
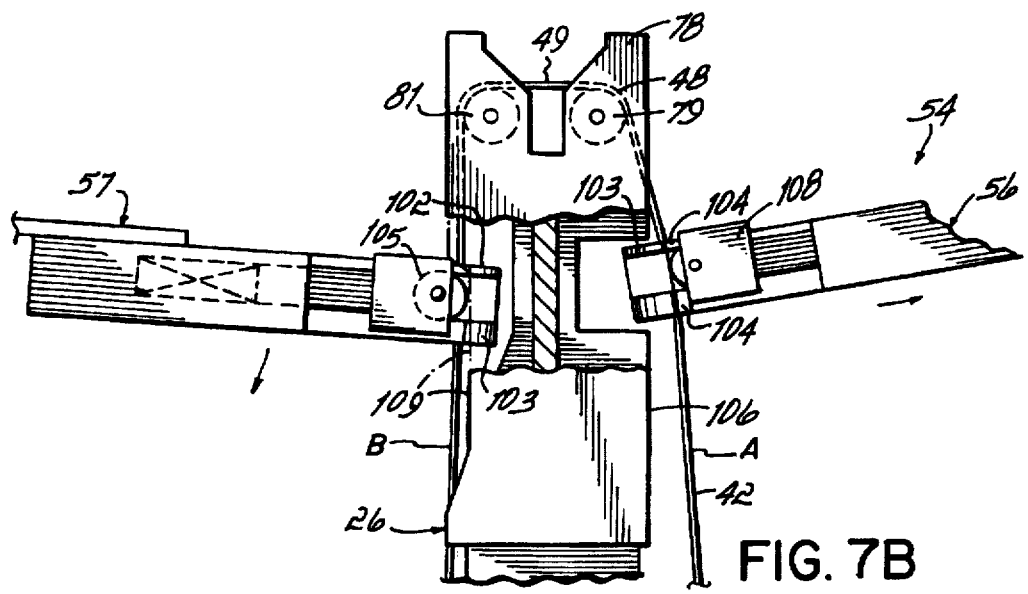
FIG. 7B is a view similar to FIG. 7A illustrating the gripper arms gripping portions of the loop.
Figure 8:
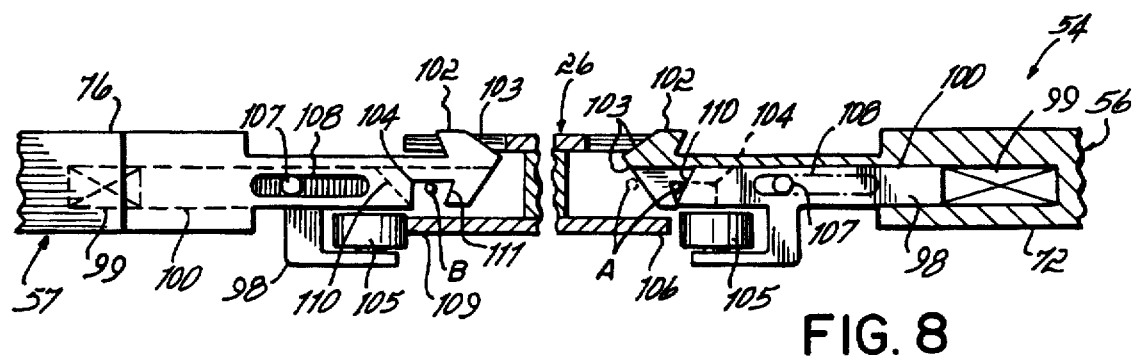
FIG. 8 is a cross-sectional view along lines 8—8 of FIG. 7A illustrating the gripper arms and spring-loaded gripping devices of the invention.

FIGS. 7A, 7B and 8 are more detailed views of the gripping devices 72, 76 engaging the loop portions on either side of the inserter arm 26. Gripping device 72 includes a sliding member 98, which is spring-biased by spring 99 and slides within a channel 100 formed in the gripping device 72. Gripping device 72 has an arrow-shaped end 102 with opposing slanted surfaces 103. A transverse channel or slot 104 is formed in gripping device 72 for holding the wire portion A. Sliding member 98 has a slanted surface 110 which cooperates with a slanted surface 111 of slot 104 to pinch or grip wire portion A therebetween. A camming wheel 105 is rotatably mounted on sliding member 98 for engaging a cam section 106 of the inserter arm 26.

As illustrated in FIGS. 7A, 7B and 8, as gripping device 72 swings into engagement with the inserter arm 26, the camming wheel 105 engages section 106 of the arm, thereby pushing sliding member 98 away from the arrow-shaped end 102 of gripping device 72 to expose slot 104. As the gripping device 72 moves toward inserter arm 26, the wire portion A is engaged by end 102 and slides up the slanted surface 103 until it moves over the end 102 and falls into slot 104. The wire portion A is shown both at the end 102 and in the slot 104 in FIG. 8 for illustrative purposes. The side of the inserter arm 26 opposite cam section 106 is open to allow full engagement of the gripping device 72 with wire portion A. A pin 107 of member 98 and slot 108 formed in gripping device 72 insure the aligned movement of the sliding member 98. To grip wire portion A, gripping device 72 is pivoted slightly downwardly and away from inserter arm 26 when the wire portion A has fallen into slot 104 (See FIG. 7B). This movement carries the camming wheel 105 away from section 106 and allows the spring-biased sliding member 98 to slide forward and grip wire portion A within slot 104 between surfaces 110 and 111 as shown in FIG. 8.

The gripping device 76 of the second gripper arm 57 is constructed in a similar way to gripping device 72, including a sliding member 98, arrow-shaped head 102, slot 104, and a camming wheel 105. As the gripping device 76 swings into position, the cam section 105 engages a sloped cam section 109, which pushes the sliding member 98 rearwardly for engagement and gripping of wire portion B. FIG. 8 shows the sliding member 98 of gripping device 76 in a rearwardmost position with the wire portion B ungripped. When the gripping device 76 swings into position, it engages wire portion B and is then subsequently moved slightly downwardly and away from the inserter arm 26, as shown in FIG. 7B, to move wheel 105 away from section 109 and allow the spring-biased sliding member 98 to slide into position and grip wire portion in slot 104.

With the gripper arms 56, 57 moved slightly apart and the wire portions of loop 48 thus gripped, the apex 49 of the loop is stretched across the forked end 78 of the inserter arm 26. The blades of the stationary cutting mechanism 80 fit within the forked end 78 as illustrated in FIGS. 5A and 7A, and the cutting mechanism is actuated to cut loop 48 at the apex 49 into portions A, B. The inserter arm 26 is then withdrawn, and the free ends of the upstream and downstream loop portions A, B are gripped by the first gripper arm 56 and second gripper arm 57, respectively (See FIG. 5B). Inserter arm 26 is retracted to its start position to await the next bale.

Stationary Cutting Mechanism

FIGS. 9 and 9A provide a more detailed illustration of stationary cutting mechanism 80. Cutting mechanism 80 comprises two opposing plates 112, 113, which are configured and are assembled together to reciprocate with respect to each other. Plate 112 moves with respect to plate 113. Plate 112 includes a plurality of slots therein (similar to slots 121a in FIG. 11) which receive guide pins 121 of plate 113 for guided movement. Pairs of opposing blades 114, 115 are positioned on respective plates 112, 113 and are attached thereto by appropriate bolts or fasteners 127 such that when plate 112 moves with respect to plate 113, the blades 114 move against blades 115 and create a cutting action to cut wire loop 48 (See FIG. 9A).

Plate 113 is stationary and is mounted by brackets 116 and 117 of frame 67, and moving plate 112 is coupled at one end to a cylinder 118 and shaft 119 for reciprocating movement. As illustrated in FIG. 9, there are preferably five sets of blades 114, 115 for engaging the wire loops 49 of the five inserter arms 26. The topmost inserter arm 26 is shown in phantom in FIG. 9 engaging the topmost set of blades 114, 115. The loop apex 49 is stretched between the blades 114, 115 and when reciprocating movement of the plates 112, 113 occurs, apex 49 of each loop 48 is cut (See FIG. 9A). A side view of the blades of rotating cutting mechanism 82 are illustrated in FIG. 11 which are similar in construction to the blades 114, 115 of cutting mechanism 80 except the blades of the rotating cutting mechanism have opposing notches as discussed below.

After each wire loop 48 has been gripped and cut and the inserter arm 26 has been retracted (See FIG. 5B), the gripper arms 56, 57 move into position to form wire overlaps 60, 61 so that bale 19 may be tied. As illustrated in FIG. 5C, shaft 75 of cylinder 74 is extended to pivot the second gripper arm 57 to move the downstream loop portion B adjacent to a side of bale 19 and generally parallel and proximate section D of baling wire 42, which is wrapped around the side of bale 19 and which extends to supply roll 41. The second gripper arm 57 folds downstream loop portion B over a catch hook 122 positioned at a back corner of bale 19 proximate guide roller 46. The catch hook 122 bends loop portion B and the generally parallel wire sections B and D form bale wire overlap 60 (See FIGS. 17 and 18).

The shaft 69 of cylinder 70 is retracted to swing first gripper arm 56 to pull the upstream loop portion A into a position proximate an incoming wire section C of baling wire from supply roll 41. As illustrated in FIG. 5C, the wire sections C and D form a continuous strand 42 of baling wire from supply roll 41 (FIG. 4A) before the strand is cut by the rotating cutting mechanism 82. The continuous strand 42 is captured by the guide roller 46 when the bale 19 moves forward along the bale path (See FIG. 4B). Guide roller 46 has wings 147, 149 mounted on either side thereof. The wings 147, 149 capture the wire strands 42 as the bale progresses so that the strands are aligned with rollers 46 and move around guide rollers 46 adjacent catch hooks 122 (see FIGS. 17, 18). When arm 56 is moved, the overlapping wire sections C and A form supply wire overlap 61. The strand 42 is eventually cut to form free wire sections C and D.

Twisting Mechanism

Before the wires are cut to form separate wire sections C and D, the twisting mechanism 88 engages the bale wire overlaps 60. The shaft 92 of cylinder 91 is retracted to pivot the twisting mechanism 88 toward the side of bale 19 (See FIG. 5C). The twisting mechanism 88 includes a plurality of twister heads 62, which engage the bale wire overlaps 60 and rotate to twist wires D and B together to tie the bale 19. Cylinder 95 is actuated to rotate twister heads 62 such that the twister heads engage the bale wire overlaps 60 at a slight angle to facilitate loading of the wire overlap into the twister assembly 140. The twisting mechanism 88 is illustrated in greater detail in FIGS. 12, 13 and 14.

Figure 12:
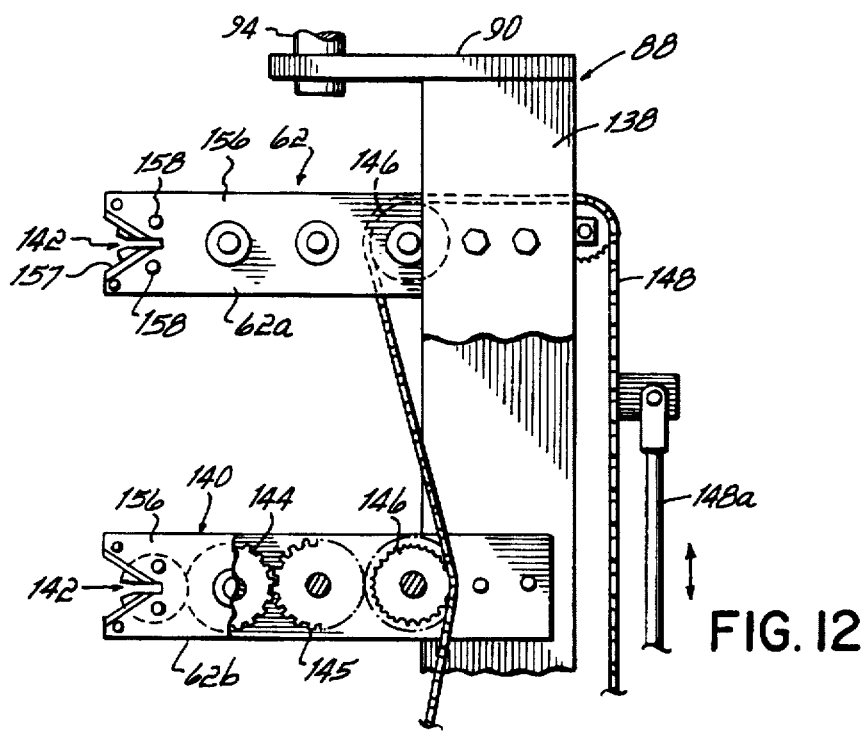
FIG. 12 is a side view, taken on lines 12—12 of FIG. 6, of the twisting mechanism and twister heads utilized in the tying assembly of the invention.
Figure 13:
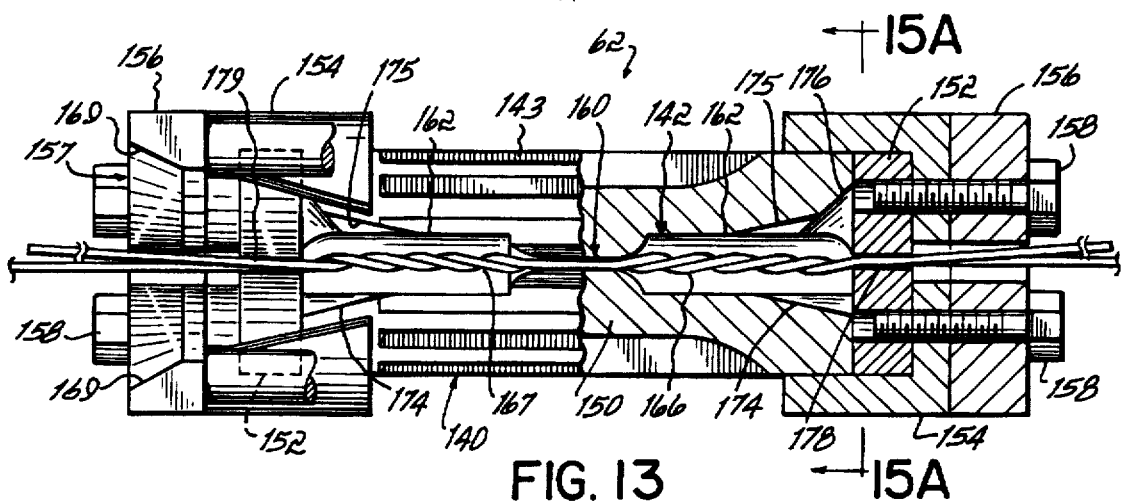
FIG. 13 is a front view, in partial cross-section, of a twister head of FIG. 12.
Figure 14:
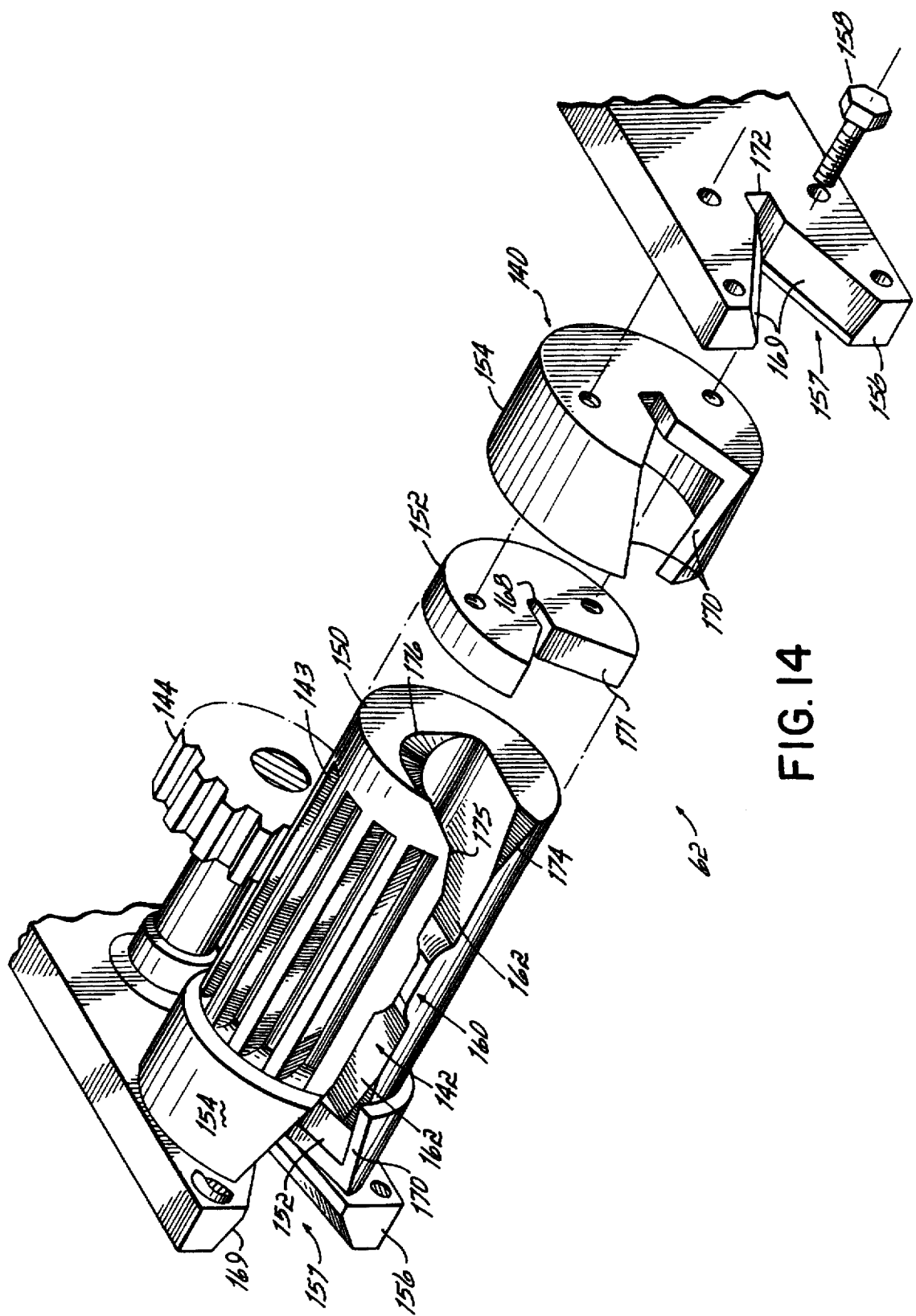
FIG. 14 is an exploded view, partially cut away, of the twister assembly of the twister heads of FIG. 13.

Referring to FIGS. 12-14, the twisting mechanism 88 includes a plurality of twister heads 62, which extend from a mounting frame 138. Each twister head 62 includes a rotating twister assembly 140 which has a slot 142 formed therein for receiving a wire overlap. Each twister assembly 140 is held between opposing end forks 156 of the twister head 62. Twister assembly 140 has gear teeth 143 formed in its outside surface (See FIG. 14). A series of cooperating gears 144, 145, and 146 are appropriately coupled to each twister assembly 140, i.e. the teeth of gear 144 engage teeth 143 on the twister assembly 140. The endmost gear 146 is coupled to a driven chain 148 or other appropriate driving mechanism. Chain 148 is preferably moved by the shaft 148a of an actuating cylinder 148b (FIG. 6). Alternatively, a motor might be used to drive chain 48. Still further, a rack (not shown) might be utilized and coupled to pinion teeth (not shown) on the endmost gears 146.

The reciprocating movement of the shaft 148a moves chain 148, which turns the gears 144, 145, 146 to rotate the twister assemblies 140. Preferably, chain 148 is linked to the endmost gears 146 of adjacent twister heads 62 such that adjacent twister assemblies rotate in opposite directions. For example, when the twister assembly 140 of twister head 62a rotates counterclockwise from movement of chain 148, the twister assembly 140 of twister head 62b rotates in a clockwise direction. While a three gear linkage is shown between the twister assemblies 140 and the drive chain 148, a two or less gear linkage or a four or greater gear linkage might be utilized.

Referring to FIG. 14, each twister assembly 140 includes a roller body 150, which is coupled at its end to opposing yokes 152 and bronze bushings or end caps 154. The yokes 152 and caps 154 have removed sections for forming slot 142. The entire twister assembly 140 is then attached to end forks 156 by bolts 158 such that the slots 157 of the forks align with the slot 142 formed in the twister assembly 140. The roller body 150 of assembly 140 is held by the caps 154 and is free to rotate. The slot 142 formed in twister assembly 140 has a thin section 160 formed at the middle of the roller body 150. When slot 142 receives the overlapped wire portions, the thin middle section 160 holds the overlapped wires next to each other at a center area of the overlap. The overlap remains untwisted in the thin middle section 160, while it is twisted at the outer sections 162. The twister heads 62 are dimensioned to fit between the slats 25 of the baler frame 12 to engage the wires close to bale 19 (See FIG. 3).

Referring now to FIG. 16, the resulting twist 164 formed by the twister assemblies 140 is shown, including an untwisted center portion 165, a twisted end portion 166, and another twisted end portion 167, which is on the other side of the center portion 165. The twisted end portions 166, 167 are twisted in opposite directions. That is, the overlapped and twisted wires of twist portion 166 are twisted in a counterclockwise direction with respect to center portion 165. The twisted overlapped wires of end portion 167, however, are twisted in a clockwise direction with respect to the center portion 165. As a result, a strong twist is formed which resists unraveling and thereby provides a bale tie having a higher strength than the pigtail ties made by existing baling systems.

When a twist 164 is formed in the present invention, twister assembly 140 of each twister head 62 is positioned such that it engages a respective wire overlap to form the twist. While the respective wires of the overlap are preferably adjacent and parallel one another (see FIG. 5C), the wires might often be separated or may lie in slot 142 at the outermost periphery of the twister assembly 140 (See FIG. 15A). Twister assembly 140 is preferably configured to direct the overlapped wires into the centermost position of the twister assembly slot 142 and end fork slots 157 to form twists 164. To that end, slot 157 of each fork 156 has opposing angled surfaces 169, which are angled into the innermost end 172 of the slot 157. Similarly, the end caps 154 have angled surfaces 170 which are angled inwardly to the innermost side 168 of slot 142 and also are angled inwardly along the longitudinal axis of the twister assembly toward the thin middle section 160 of the roller body 150, as illustrated in FIG. 14. The yokes 152 also have angled surfaces 171 which are angled to the innermost side 168 of the slot 142 similar to angled surfaces 170. Furthermore, the ends of the roller body 150 are shaped to engage the overlapped wires and bring the wires to the center of the twister assembly to form a twist.

Referring to FIGS. 14, 15A, 15B, and 15C, the ends of the roller body include an inwardly angled surface 174 on one side of the slot 142 and another inwardly angled surface 175 on the other side of slot 142. Both angled surfaces 174 and 175 are angled inwardly to the center of roller body 150 toward the innermost side 168 of slot 142 and are also sloped along the longitudinal axis of the twister assembly 140 from the ends of the roller body 150 toward the roller body middle section 160. Between the angled surfaces 174, 175 is another angled surface 176 which is more gradually angled to the innermost side 168 of slot 142 and is sloped toward the roller middle section 160. Angled surface 176 sweeps around roller body 150 into the innermost side 168 of the slot 142. The combination of the inwardly angled surfaces 174, 175, and 176 acts to direct the wire overlap to the innermost side 168 of slot 142 such that a sufficient twist is formed when the roller body 150 rotates.

Figure 15A:
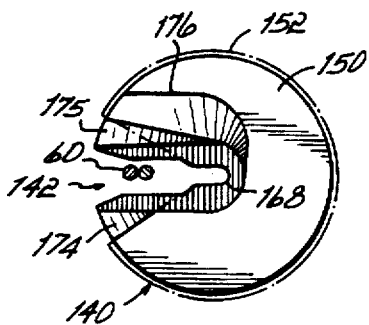
Figure 15B:
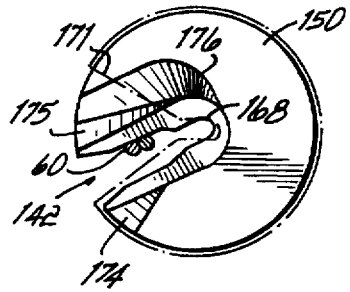
FIGS. 15B and 15C illustrate the twister assembly at various positions along its cycle of rotation.
Figure 15C:
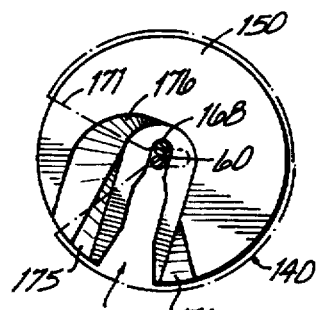

For example, if the wire overlap is at the outer periphery of the roller body 150, and the roller body is rotated counterclockwise as illustrated in FIG. 15A, the surfaces 175, 176 engage the overlap 60. As the roller body 150 turns, surfaces 170 and 171 of the yoke and cap engage the wire overlap. The overlap 60 is forced against the surfaces 170, 171 by the roller body 150 and will follow the sweeping angled surface 176 inwardly into the innermost side 168 of slot 142, as illustrated in FIG. 5B. That is, the overlap 60 moves to the center of the roller body 150. Generally, when the roller body 150 has completed less than one quarter of a turn, the wire overlap 60 is positioned at the innermost side 168 as shown in FIG. 15C. When the overlap is in this position, the center portion of the twist 165 is gripped by the middle section 160 of the roller body, while the ends of the twist 178, 179 are held within the yokes 152 and caps 154. As illustrated in FIG. 13, the individual wires of the overlap 60 are held next to each other at the twist center portion 165 and at the ends 178, 179 but are free to twist elsewhere. The ends 178 and 179 are held stationary in the yokes 152 and caps 154 while the center portion 165 is twisted to form the twisted end portions 166 and 167 of twist 164.

Figure 17:
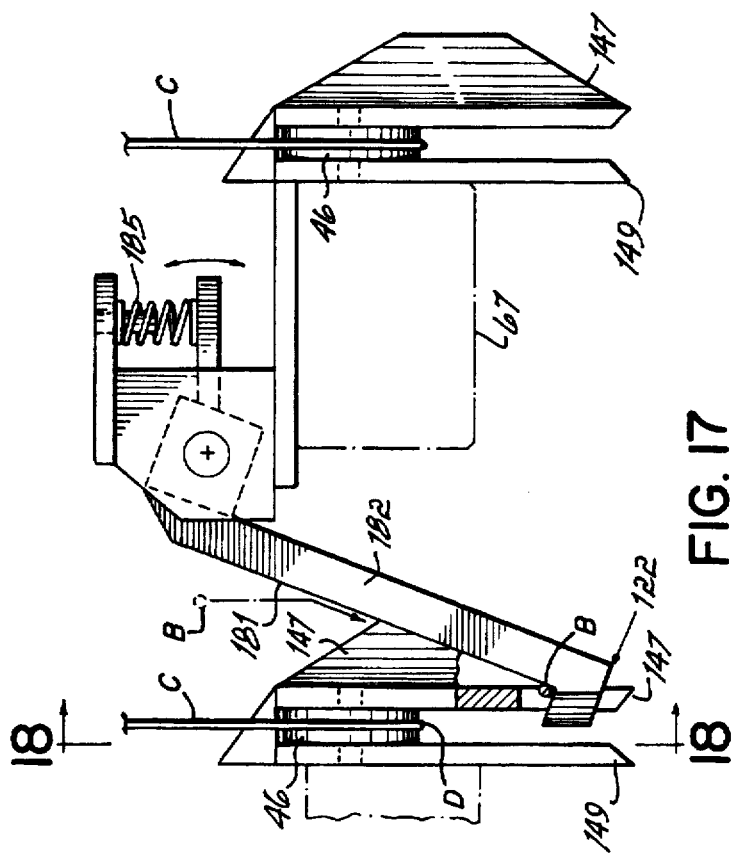
FIG. 17 is a side view of a catch mechanism utilized by the tying assembly of the present invention.
Figure 18:
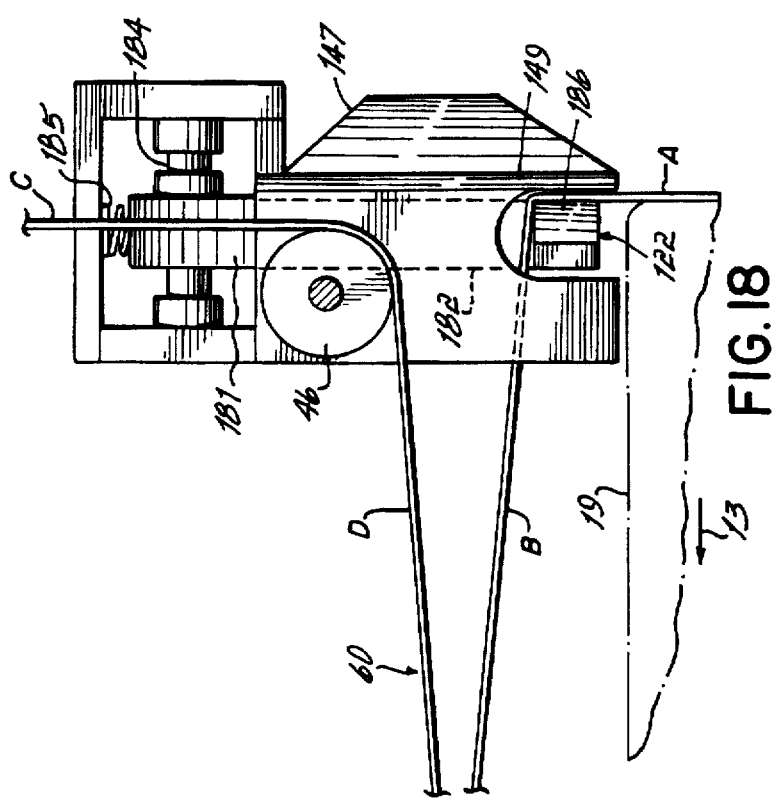
FIG. 18 is a cross-sectional view along lines 18—18 of FIG. 17.

As discussed above, the downstream loop portion B is folded over catch hook 122, and adjacent to wire section D proximate the bale. Referring to FIG. 17, when the loop portion B is moved downwardly over bale 19 by the second gripper arm 76, it engages sloped surface 181 of the body 182 of catch hook 122. Wire B slides down surface 181 to the catch hook 122 to rest in a hooked position as shown in FIG. 17. Hook body 182 is hingedly mounted to frame 25 at a pivot 184 and is spring-biased by spring 185 at an end thereof to move into a position against surface 181 to capture the downstream loop portion B when it is bent. The wire portions C and D extend over guide roller 46, while the downstream loop portion B is held over catch hook 122 (See FIG. 18).

Figure 17A:
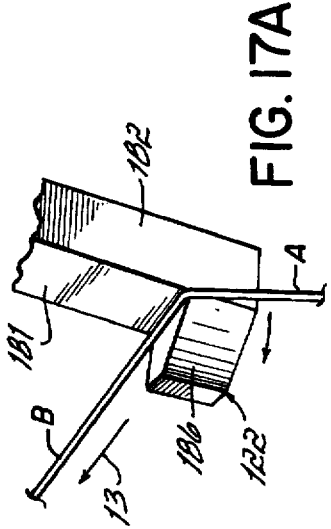
FIG. 17A is an enlarged prospective view of a portion of the catch mechanism of FIG. 17.

When the twisting mechanism 88 twists the bale wire overlap wire 60, the downstream loop portion B is pulled tight and moves forwardly as illustrated in FIG. 17A. The hook 122 is positioned close to bale 19 so that the tie may be wrapped tightly around the bale 19.

Referring again to FIG. 5C, when the twist is made at the bale wire overlap 60, the twisting mechanism 88 is actuated to pull the twister heads 62 away from the bale twists, and the twisting mechanism is moved to the supply wire overlaps 61 to form other twists. As illustrated in FIG. 6, the twisting mechanism 88 utilizes a plurality of twister heads 62 such that all of the bale wire overlaps are twisted simultaneously and, preferably, in opposite directions. In that way, bale 19 is tied at the side of the bale at several vertically-spaced positions along its height.

As illustrated in FIG. 5D, the twists 164 formed at the bale wire overlap lie generally parallel to a side of the bale 19. Any forces along the bale wire, such as from expansion of the bale or handling of the bale, are directed generally parallel to twists 164, rather than perpendicular to the twist as occurs with the pigtail twists of existing baler systems. The unique twist 164 of the present invention provides a stronger and more reliable twist to hold the bale wire wrapped around bale 19. Furthermore, the twist 164 lies generally flat against the side of the bale to prevent the twist from catching on another bale when the bales are stacked and moved, or from catching on a person or object when handling the bale. Still further, when the twists 164 of the invention are formed, the end of the downstream loop portion B is loose and is free to move when the twist is formed. Thus, the stressed areas of the wire are minimized, reducing breakage of the wire after it is tied around the bale.

Referring again to FIG. 5D, after the twist 164 is formed at the bale wire overlap 60, the shaft 92 of cylinder 91 is extended to move the twisting mechanism 88 to the supply wire overlap 61. The shaft 96 of cylinder 95 is simultaneously extended to swing the twisting mechanism 88 into position such that the twister heads 62 are adjacent wire overlaps 61. The twister assemblies 140 of the various twister heads 62 engage the supply wire overlaps 61 and twist the overlaps to form twists similar to twist 164 on the bale 19. Preferably, the twister head 62 engages wire section C and forces the wire section toward the loop portion A to overlap the loop portion. Loop portion A is gripped by gripper arm 56. The second twists formed at overlap 61 effectively splice together wires A and C to form a continuous baling wire strand similar to strand 42 for engaging, wrapping, and tying the next successive bale (See FIG. 4A).

After the second twist 61 is formed, and as the bale 19 moves forward, the second gripper arm 57 swings toward bale 19 and the gripping device 76 of each arm engages a respective cam 125 as illustrated in FIGS. 5C and 6. The cam 125 is partially cut away in FIG. 5C to illustrate bale wire overlap 60; however, cam 125 is positioned to engage the camming wheel 105 of gripping device 76 to move sliding member 98 rearwardly to ungrip the downstream loop portion B similar to the ungripped wire shown in FIG. 8. Therefore, the wire proximate twist 60 is ungripped and the bale is free to continue its forward motion. Furthermore, as the bale 19 moves forward, the wire wrapped around bale 19 slides up the angled surface 186 of hook 122 and pivots and disengages hook 122 as illustrated in FIG. 17. Spring 185 insures that catch hook 122 pivots back to its rest position to catch the downstream loop portion of the next successive bale. Similarly, the first gripper arm 56 simultaneously swings further after formation of the second twists such that the camming wheel 105 of gripping device 72 engages a respective cam 126 to ungrip upstream loop portion A (See FIG. 6).

Rotating Cutting Mechanism

Before twisting the supply wire overlaps, the tying assembly 22 is operable to move the rotating cutting mechanism 82 into position by extending shaft 85 of cylinder 84. As illustrated in FIG. 5D, the rotating cutting mechanism 82 swings around pivot point 83 and engages the baling wire strand 42 between wire sections C and D to make a cut. In doing so, the rotating cutting mechanism also engages wire section A.

The rotating cutting mechanism is illustrated in greater detail in FIGS. 10 and 11 and includes reciprocating plates 128 and 129. Preferably, plate 129 is rigidly mounted to brackets 130, 131 and includes guide pins 121 which fit within slots 121a formed in plate 128 for smooth, guided movement of plate 128 against plate 129. The upper end of plate 128 is coupled to the shaft 132 of actuating cylinder 133 for reciprocating movement with respect to stationary plate 129. Opposing blades 135 and 136 are respectively attached to plates 129 and 128 by bolts 141 and move against each other to cut the wire similar to the cutting mechanism 80 discussed hereinabove. The entire rotating cutting mechanism 82 is rotatably mounted by brackets 134a, 134b to pivots 83a, 83b, respectively. As illustrated in FIG. 5D, actuation of cylinder 84 swings the rotating cutting mechanism 82 on pivots 83a, 83b and into position. Thereafter, cylinder 133 is actuated to cut the wires. Notches 124 formed in the blades 135, 136 capture wire section A, and as illustrated in FIG. 11, ensure that the A wires are properly seated against plates 128, 129 and do not get cut when the blades 135, 136 come together (FIG. 11). When the blades 135, 136 do come together, wires C and D are cut apart to form free wire sections. As illustrated in FIG. 4F, when the cut between wires C and D is made, the bale is free from the supply wire strand 42 and may be moved out of the baler. After the cut is made, the twisting mechanism 88 is again energized to twist overlapping wire sections A and C to reform strand 42. As the bale moves forward after the second twists 61 are made, the gripping device 72 engages cam 126 and releases the free end of the wire section D (see FIG. 5D).

As is illustrated in FIGS. 4A–4G, the wire twist at the supply wire overlap 61 forms one of the twists on the tied bale wire. Therefore, in accordance with the principles of the present invention, a bale is tied with wire having two wire twists which extend parallel to a side of the bale and are wrapped with twisted end portions having opposite direction twists. Baling wire tied in accordance with the principles of the invention is extremely resistant to unraveling and the twists do not project away from the bale, thereby avoiding being caught upon another bale or object.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An automatic tie system for a baler for tying a bale of compressible material, the automatic tie system comprising:
   a reciprocating ram for pushing the bale along a path through the baler;
   at least two supply rolls of baling wire each positioned on opposite sides of said path and operably coupled together such that a continuous strand of baling wire extends generally transverse to the path to engage a front end of the bale and wrap around the bale as it is pushed along said path;
   an inserter mechanism including a reciprocating inserter arm moving in a direction generally transverse said path and operable for engaging said continuous strand and moving the strand across a back end of the bale to form a partial loop having an apex and an upstream wire section and a downstream wire section;
   a gripper mechanism including a first gripper arm operable to grip the upstream section of said loop and a second gripper arm operable to grip the downstream section of said loop;
   a cutting mechanism for cutting said loop proximate the apex, the inserter being operable to move in a direction away from the cut loop;
   the second gripper arm being operable, after the loop is cut, for moving the downstream loop section adjacent the bale into a position proximate a section of wire from one of said baling wire supply rolls to create a bale wire overlap and the first gripper arm operable for moving the upstream loop section into a position proximate an incoming section of wire from one of said baling wire supply rolls to create a supply wire overlap;
   a twisting mechanism operable to engage said bale wire overlap and twist the bale wire overlap to tie the bale and further operable to engage said supply wire overlap and twist the supply wire overlap to reform a continuous strand of baling wire between the rolls to engage and wrap another bale whereby successive bales may be automatically and continuously tied.

2. The automatic tie system of claim 1, the gripper arms being pivotally mounted and pivoting such that the arms extend generally transverse to the upstream and downstream loop sections to grip said sections.

3. The automatic tie system of claim 1 wherein the gripper arms each include a spring-loaded gripping device, the gripping device operable to cam against a surface of the inserter arm and engage one of the upstream and downstream loop sections and further operable for gripping the respective loop section.

4. The automatic tie system of claim 3 further comprising a bale cam surface, the gripping device of the second gripper arm engaging the bale cam surface when the bale wire overlap has been twisted and the bale moves through the tie system to ungrip the downstream section such that the bale may continue its movement through the system.

5. The automatic tie system of claim 3 further comprising a supply cam surface, the gripping device of the first gripper arm engaging the supply cam surface when the supply wire overlap has been twisted and the bale moves through the tie system to ungrip the upstream section such that the bale may continue its movement through the system.

6. The automatic tie system of claim 1, the inserter arm having a forked end, the apex of the loop stretched across the forked end when the inserter engages the strand and the cutting mechanism including a blade which fits into the forked end proximate the apex to cut the loop.

7. The automatic tie system of claim 1 further comprising a second cutting mechanism operable for cutting said strand of baling wire and creating the wire section for said bale wire overlap and the incoming wire section for said supply wire overlap.

8. The automatic tie system of claim 1, the twisting mechanism including a movable twister head, the twister head being movable between a first position to engage and twist the bale wire overlap and a subsequent second position to engage and twist the supply wire overlap.

9. The automatic tie system of claim 1, the twisting mechanism including a rotating roller having a slot formed therein to receive adjacent wire sections from one of said wire overlaps, the roller being operable to rotate and twist the overlapped wire sections to form a wire twist.

10. The automatic tie system of claim 9 wherein the roller includes a sloped surface formed therein proximate at least one end of the slot, the sloped surface engaging the wires of said wire overlaps and directing the overlaps inwardly to a center section of the roller to twist the overlaps.

11. The automatic tie system of claim 1 wherein at least one twisted overlap includes a wire twist having a center portion and opposite end portions, the opposite end portions having opposite twist directions relative one another.

12. The automatic tie system of claim 1, the tying assembly including a twister head configured to engage the bale wire overlap and twist the wires of the overlap to form a wire twist which extends in a direction generally parallel to a side surface of the bale to lie generally flat against said bale side surface.

13. The automatic tie system of claim 1, the tying assembly including a twister head configured to engage the supply wire overlap and twist the wires of the overlap to form a wire twist which extends in a direction generally parallel to the loop upstream section and the incoming wire section to form said continuous strand.

14. A tying assembly for an automatic tie system, the baler having a reciprocating ram for pushing a bale of compressible material along a path and into a continuous strand of baling wire supplied from at least two supply rolls on each side of the path and including an inserter arm for engaging the continuous strand and moving the strand across an end of the bale to form a partial wire loop having an apex and an upstream wire section and downstream wire, the tying assembly comprising:

a gripper mechanism including a first gripper arm operable to grip the upstream section of said loop and a second gripper arm operable to grip the downstream section of said loop;

a cutting mechanism for cutting said loop proximate the apex, the inserter being operable to move in a direction away from the cut loop;

the second gripper arm being operable, after the loop is cut, for moving the downstream loop section adjacent the bale into a position proximate a section of wire from one of said baling wire supply rolls to create a bale wire overlap and the first gripper arm operable for moving the upstream loop section into a position proximate an incoming section of wire from one of said baling wire supply rolls to create a supply wire overlap;

a twisting mechanism operable to engage said bale wire overlap and twist the bale wire overlap to tie the bale and further operable to engage said supply wire overlap and twist the supply wire overlap to reform a continuous strand of baling wire between the rolls to engage and wrap another bale whereby successive bales may be automatically and continuously tied.

15. The tying assembly of claim 14 wherein the gripper arms each include a spring-loaded gripping device, the gripping device operable to cam against a surface of the inserter arm and engage one of the upstream and downstream loop sections and further operable for gripping the respective loop section.

16. The tying assembly of claim 14 further comprising a second cutting mechanism operable for cutting said strand of baling wire and creating the wire section for said bale wire overlap and the incoming wire section for said supply wire overlap.

17. The tying assembly of claim 14, the twisting mechanism including a movable twister head, the twister head being movable between a first position to engage and twist the bale wire overlap and a subsequent second position to engage and twist the supply wire overlap.

18. The tying assembly of claim 14, the twisting mechanism including a rotating roller having a slot formed therein to receive adjacent wire sections from one of said wire overlaps, the roller being operable to rotate and twist the overlapped wire sections to form a wire twist.

19. The tying assembly of claim 14 wherein at least one twisted overlap includes a wire twist having a center portion and opposite end portions, the opposite end portions having opposite twist directions relative one another.

20. The tying assembly of claim 14, the tying assembly including a twister head configured to engage the bale wire overlap and twist the wires of the overlap to form a wire twist which extends in a direction generally parallel to a side surface of the bale to lie generally flat against said bale side surface.

21. The tying assembly of claim 14, the tying assembly including a twister head configured to engage the supply wire overlap and twist the wires of the overlap to form a wire twist which extends in a direction generally parallel to the loop upstream section and the incoming wire section to form said continuous strand.

22. A method for tying a bale of compressible material within an automatic baler comprising the steps of:

pushing the bale along a path through the baler;

engaging a front end of the bale with a continuous strand of baling wire which extends generally transverse to the path such that the strand wraps around the bale as it is pushed along said path, the strand operably coupling together two supply rolls of baling wire which are positioned on opposite sides of said path;

engaging said continuous strand and moving the strand across a back end of the bale in a direction generally transverse to said path to form a partial loop having an apex and an upstream wire section and a downstream wire section;

gripping the upstream section of said loop and gripping the downstream section of said loop;

cutting said loop proximate the apex;

after the loop is cut, moving the downstream section of said loop adjacent to the bale into a position proximate a section of wire from one of said baling wire supply rolls to create a bale wire overlap and moving the upstream section of said loop into a position proximate an incoming section of wire from one of said baling wire supply rolls to create a supply wire overlap;

twisting the bale wire overlap to tie the bale;

twisting the supply wire overlap to reform a continuous strand of baling wire between the rolls to engage and wrap another bale whereby successive bales may be automatically and continuously wrapped and tied.

23. The method of claim 22 further comprising gripping the loop sections with gripper arms having spring-loaded gripping devices which engage one of the upstream and downstream loop sections and grip the respective loop section.

24. The method of claim 23 further comprising actuating a gripping device when the bale wire overlap is created to release the gripped downstream section such that an ungripped loop section is twisted.

25. The method of claims 23 further comprising actuating a gripping device when the supply wire overlap is created to release the gripped downstream section such that an ungripped loop section is twisted.

26. The method of claim 22 further comprising stretching the apex of the loop across a forked end of a movable inserter arm which engages the strand and fitting a blade of a cutting mechanism into the forked end proximate the apex to cut the loop.

27. The method of claim 22 further comprising cutting said strand of baling wire between the supply rolls and creating a generally free wire section for said bale wire overlap and a generally free incoming wire section for said supply wire overlap.

28. The method of claim 22 further comprising twisting the wire overlaps with a twister head and moving the twister head to a first position to engage and twist the bale wire overlap and subsequently moving the twister head to a second position to engage and twist the supply wire overlap.

29. The method of claim 28 wherein the twister head includes a rotating roller having a slot formed therein and further comprising engaging the roller with one of said wire overlaps such that the wire overlap is positioned within the slot and rotating the roller to form a wire twist.

30. The method of claim 22 wherein the wire overlaps are each twisted to form a twist and the wire twist has a center section and opposite end sections, the opposite end sections having opposite twist directions relative one another.

31. The method of claim 22 further comprising engaging the bale wire overlap and twisting the wires of the overlap to form a wire twist which extends in a direction generally parallel to a side surface of the bale to lie generally flat against said bale side surface.

32. The method of claim 22 further comprising engaging the supply wire overlap and twisting the wires of the overlap to form a wire twist which extends in a direction generally parallel to the loop upstream side and the incoming wire section to form said continuous strand.

33. A method for tying a bale of compressible material comprising the steps of:
- wrapping a portion of a continuous baling wire strand around a bale;
- cutting the continuous baling wire strand such that the strand portion around the bale has opposing free ends;
- positioning the opposing free ends adjacent each other generally parallel one with the other to form a bale wire overlap.
- twisting the generally parallel free ends of the bale wire overlap for tying the bale and forming an elongated twist with opposing end sections, that have opposite hand twisting directions to create a strong twist to tie the bale.

34. The method of claim 33 further comprising:
- cutting the continuous wire strand to form a second set of free wire ends;
- positioning the free wire ends from the second set adjacent each other and generally parallel one with the other to form a supply wire overlap;
- twisting the generally parallel free ends of the supply wire overlap for reforming the continuous baling wire strand, and forming a second elongated twist with opposite end sections that have opposite hand twisting directions.

35. The method of claim 33 wherein the continuous baling wire strand includes a second pre-formed elongated twist, having opposite hand twisted end sections, the method further comprising wrapping a portion of the strand including the second pre-formed twist around the bale such that the bale is tied by wire including two twists with end sections having opposite hand twisting directions.

36. The method of claim 33 further comprising forming the elongated twist to extend generally parallel to a side of the bale.

37. An automatic tie system for a baler for tying a bale of compressible material, the automatic tie system comprising:

- a reciprocating ram for pushing a bale along a path through a baler;
- a supply of baling wire for presenting a strand of baling wire transverse to the path to engage a front end of the bale and wrap around the bale as it is pushed along said path;
- an inserter mechanism operable for engaging said wire strand and moving the strand across a back end of the bale to form an upstream wire section and a downstream wire section;
- a gripper mechanism operable for engaging the upstream section of said wire strand and engaging the downstream section of said strand, the gripper mechanism further operable for moving the downstream loop section into a position proximate another section of the baling wire strand to create a bale wire overlap and operable for moving the upstream loop section into a position proximate a section of wire from said baling wire supply to create a supply wire overlap;
- a twisting mechanism operable to engage said bale wire overlap and twist the bale wire overlap to tie the bale and further operable to engage said supply wire overlap andtwist the supply wire overlap to reform a strand of baling wire between the rolls to engage and wrap another bale;
- the twisting mechanism including a rotating roller having a slot formed therein to receive wire sections from at least one of said wire overlaps, the roller being operable to rotate and twist the overlap wire sections to form a wire twist, the roller including a sloped surface formed therein proximate at least one end of the slot, the sloped surface engaging the wire sections of said wire overlap and directing the overlap sections inwardly to a center section of the roller to twist the overlap;
- whereby successive bales may be automatically and continuously tied.

38. A tying assembly for tying a bale comprising:
- a twisting mechanism operable for engaging the overlapped ends of a baling wire wrapped around a bale and twisting the overlapped ends to form a twist to tie a bale;
- the twisting mechanism including at least one rotating roller having a slot formed therein to receive said overlapped wire ends, the roller being operable to rotate and twist the overlapped wire ends to form said twist, the roller having a sloped surface formed therein proximate at least one end of the slot, the sloped surface of the slot engaging the overlapped ends and, as the roller rotates and forms the twist, directing the overlapped ends inwardly to a center section of the roller;
- whereby to more properly form the twist from the overlapped wire ends.

* * * * *

UNITED STATES PATENT AND TRADEMARK OFFICE
CERTIFICATE OF CORRECTION

PATENT NO. : 5,704,283
DATED : January 6, 1998
INVENTOR(S) : John Wiedel

It is certified that error appears in the above-identified patent and that said Letters Patent is hereby corrected as shown below:

Column 6, line 29, delete "of 5 ram" and insert --of ram 16--.

Column 7, lines 65-66, delete the second "the".

Column 18, line 49, delete "claims" and insert --claim--.

Column 19, line 43, delete "stand" and insert --strand--.

Signed and Sealed this

Nineteenth Day of January, 1999

Attest:

Attesting Officer

*Acting Commissioner of Patents and Trademarks*